United States Patent [19]

Metzger et al.

[11] Patent Number: 4,901,349
[45] Date of Patent: Feb. 13, 1990

[54] TIME DISPERSAL ENCRYPTION OF TV SIGNALS

[75] Inventors: Sidney Metzger, Rockville; Ronald K. Garlow, Damascus, both of Md.

[73] Assignee: Communications Satellite Corporation, Washington, D.C.

[21] Appl. No.: 140,267

[22] Filed: Dec. 31, 1987

[51] Int. Cl.⁴ .......................................... M04N 7/167
[52] U.S. Cl. ........................................ 380/11; 380/14; 380/15
[58] Field of Search .............................. 380/11, 14, 15

[56] References Cited

U.S. PATENT DOCUMENTS

| | | |
|---|---|---|
| 2,846,497 | 8/1958 | Kennedy . |
| 2,875,269 | 2/1959 | Ridenour . |
| 3,081,376 | 3/1963 | Loughlin . |
| 3,116,363 | 12/1963 | Doundoulakis . |
| 3,184,537 | 5/1965 | Court et al. . |
| 3,813,482 | 5/1974 | Blonder . |
| 4,045,814 | 8/1977 | Hartung et al. . |
| 4,095,258 | 6/1978 | Sperber . |
| 4,594,609 | 6/1986 | Romao et al. ............ 380/11 |
| 4,663,659 | 5/1987 | Blatter ..................... 380/14 |

Primary Examiner—Stephen C. Buczinski
Attorney, Agent, or Firm—Sughrue, Mion, Zinn, Macpeak & Seas

[57] ABSTRACT

In encrypting a video signal for communications security, the horizontal synchronization pulses are removed, the active signal portions of each line in a field are delayed according to psuedorandom sequence of delays, and the reference color burst is moved to a position in the horizontal blanking interval which is constant for all lines irrespective of their individual delays. The process is reversed for decryption.

46 Claims, 17 Drawing Sheets

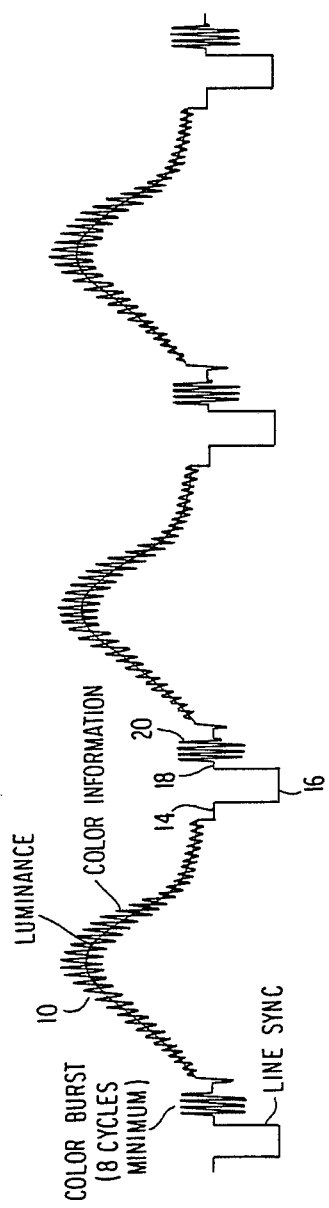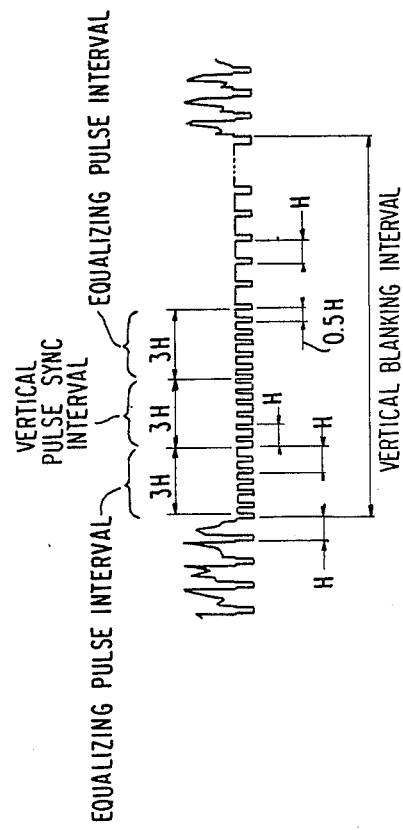

ALL TIMES ARE IN MICROSECONDS
TOTAL TIME FOR SCAN LINE IS 63.555 MICROSECONDS

HORIZONTAL BLANKING TIMING. FCC SPECIFICATIONS

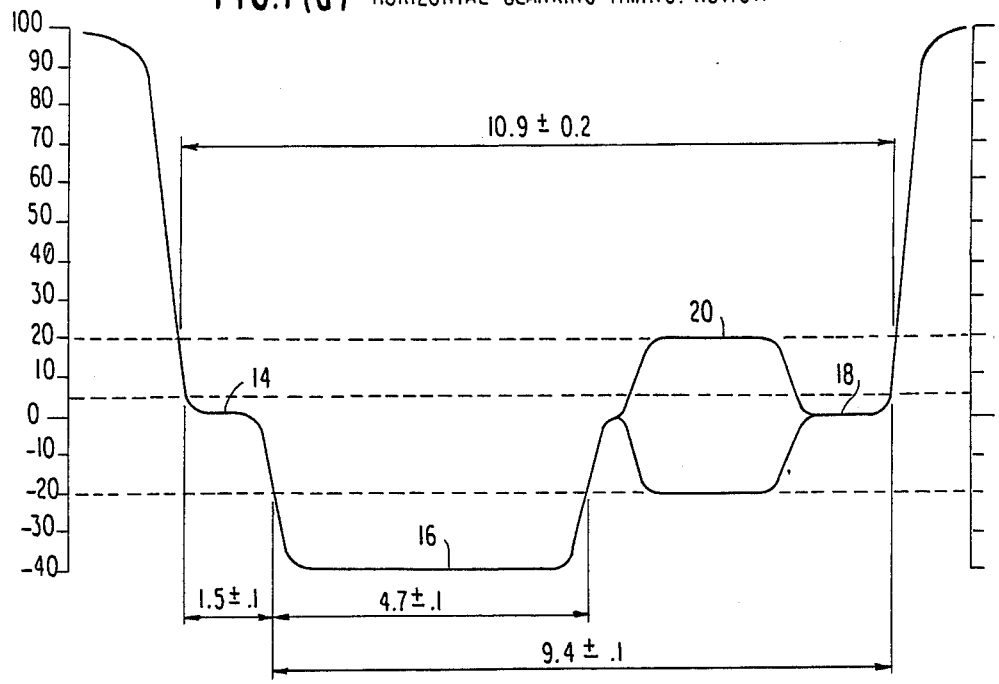
FIG.1(d) HORIZONTAL BLANKING TIMING. RS170A
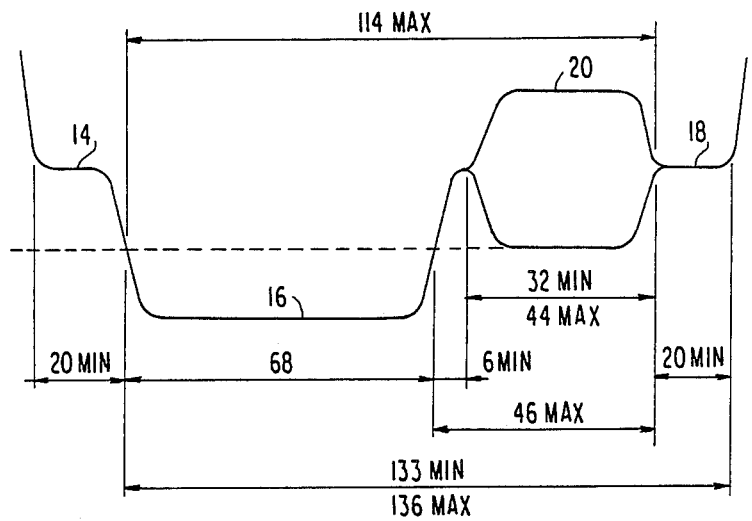
FIG.2 HORIZONTAL TIMING
ALL TIMES IN CLOCK PERIODS @ 14.3 MHz

RASTER SCAN OF A BLACK BAR

BLACK BAR AFTER TIME DISPERSAL,
PK-PK DISPLACEMENT = 7 µs

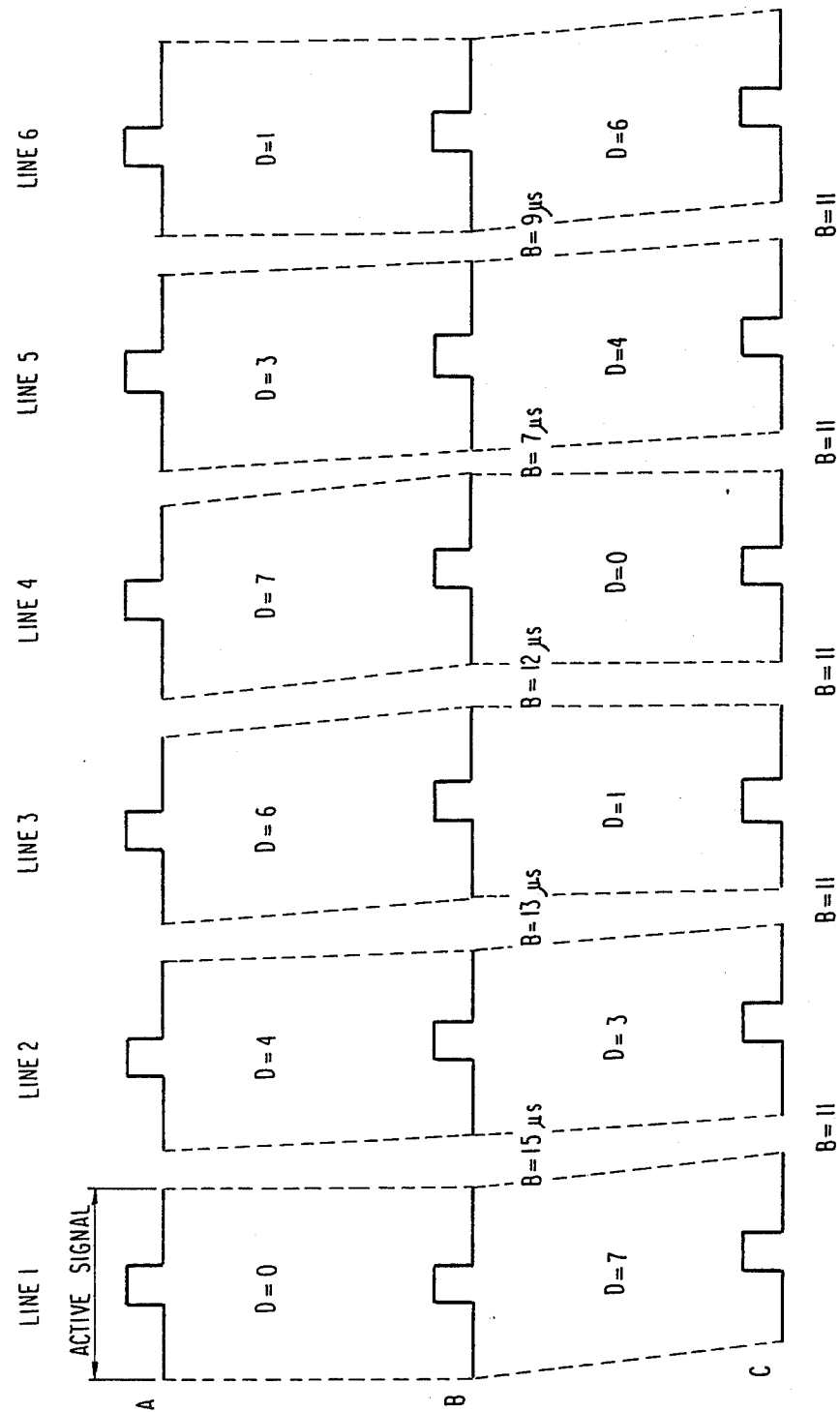

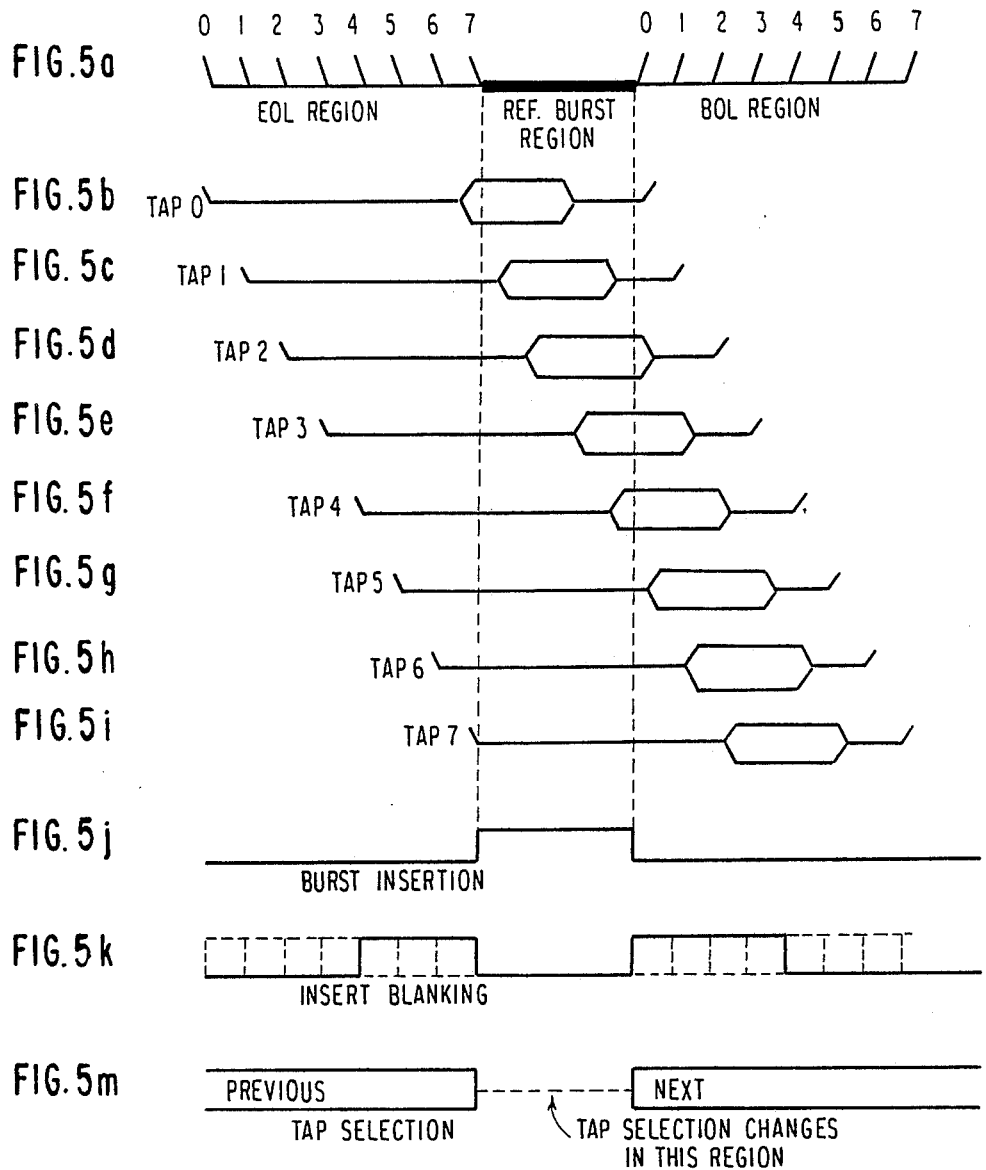

VIDEO OUT
WITH DELAY 0

BLANKING INSERT FOR DELAY 0

VIDEO OUT
WITH DELAY 3

BLANKING INSERT FOR DELAY 3

VIDEO OUT
WITH DELAY 6

BLANKING INSERT FOR DELAY 6

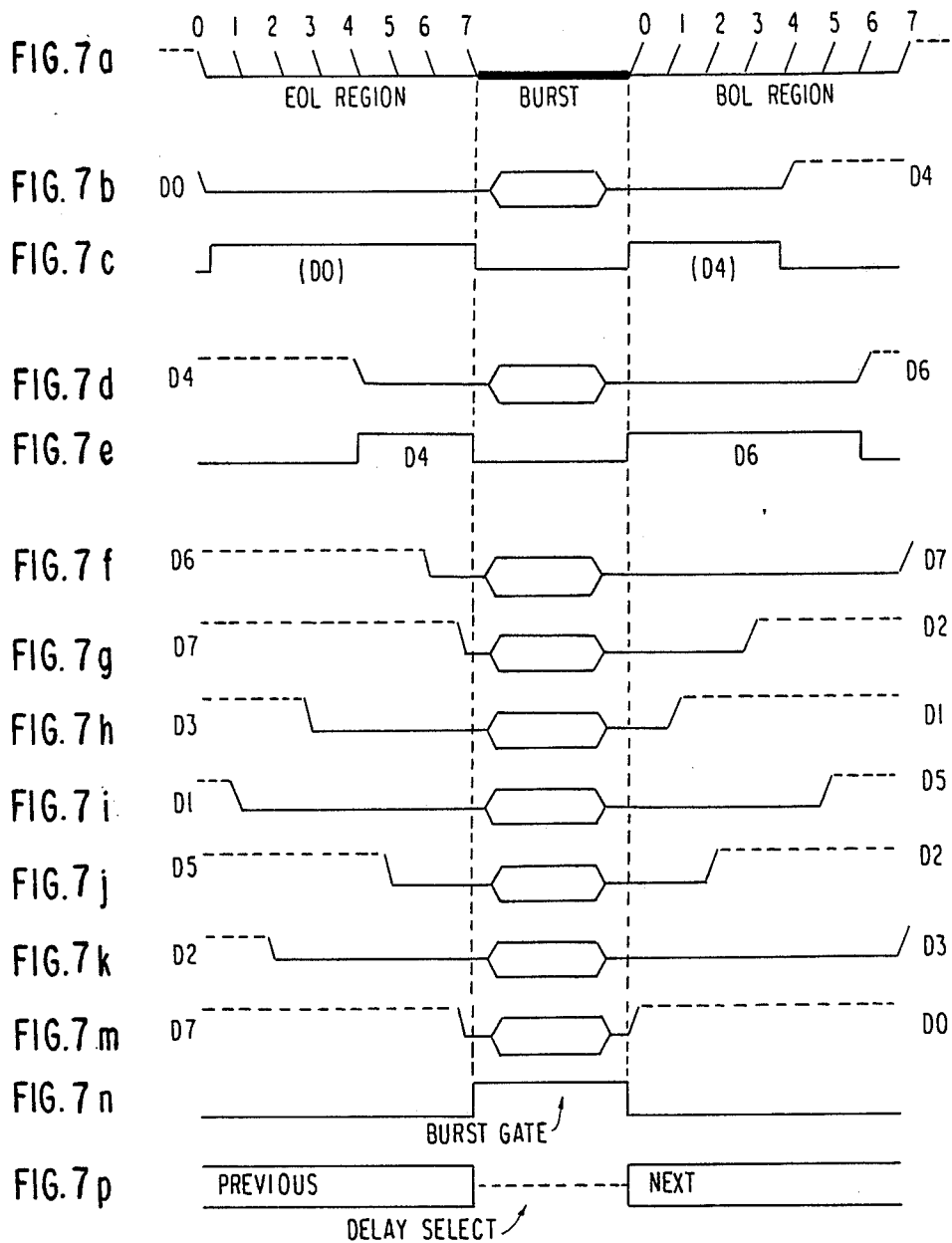

TAPPED DELAY

FIG.11a TRANSMITTER DELAY CONTROL
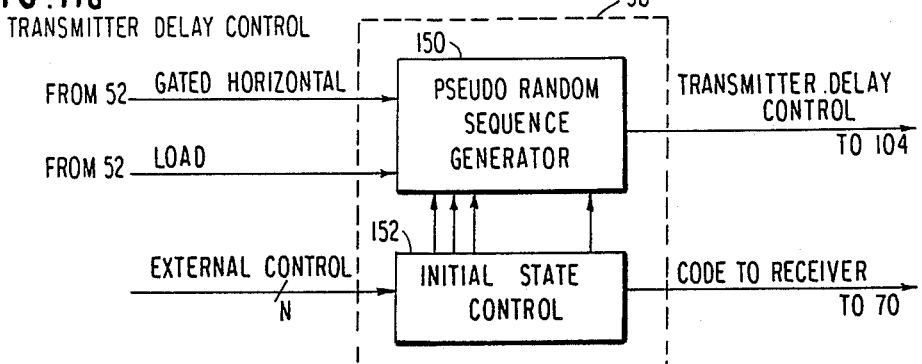
FIG.11b VERTICAL SYNC
FIG.11c GATED HORIZONTAL SYNC
FIG.11d LOAD PSEUDO-RANDOM SEQUENCE GENERATOR
FIG.11e RECEIVER DELAY CONTROL
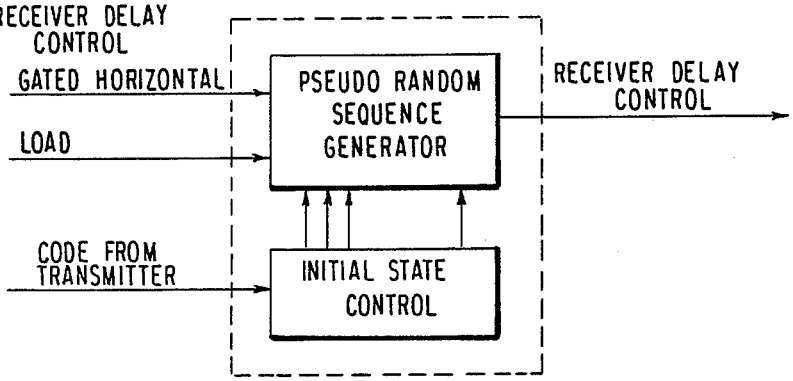

FIG. 14 a VIDEO INPUT
FIG. 14 b CLOCK ENABLE
FIG. 14 c VIDEO OUTPUT
FIG. 14 d OUTPUT SELECT

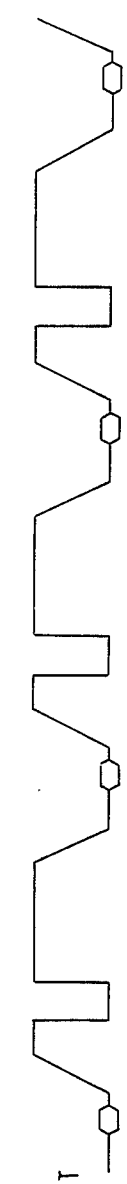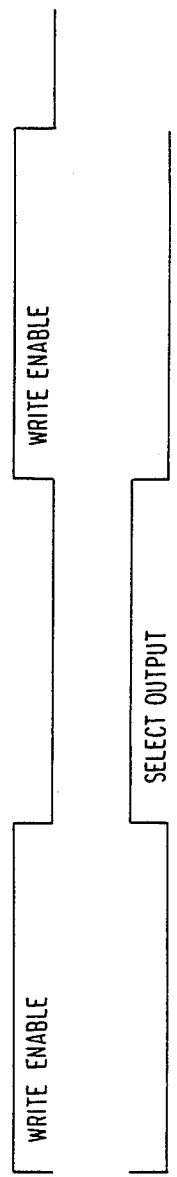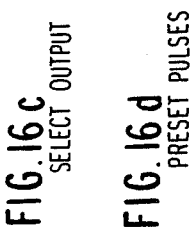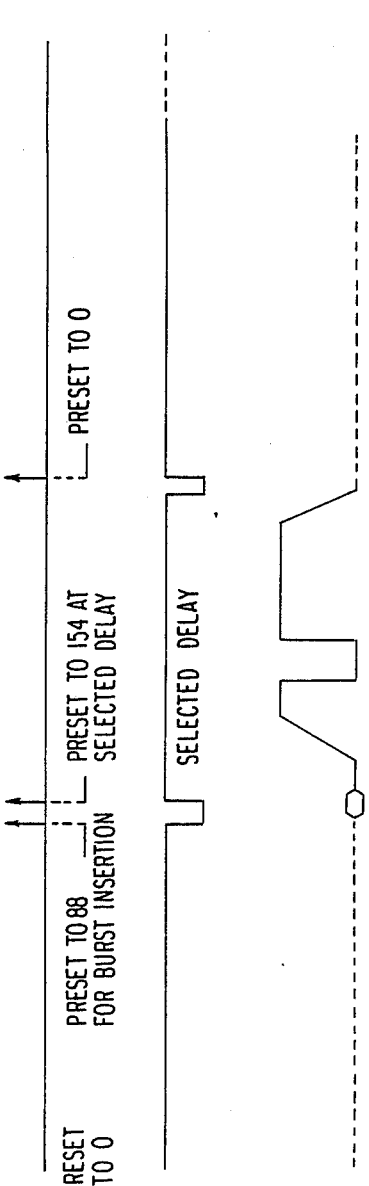
FIG.16a VIDEO TO DELAY UNIT
FIG.16b WRITE ENABLE
FIG.16c SELECT OUTPUT
FIG.16d PRESET PULSES
FIG.16e CLOCK ENABLE
FIG.16f VIDEO OUT

TIME DISPERSAL ENCRYPTION OF TV SIGNALS

BACKGROUND OF THE INVENTION

This invention is directed generally to television signal processing and more specifically to a technique of encrypting television signals such that only designated subscribers can decode and display the television signal.

It is often desirable to transmit a video signal to a particular destination while maintaining a degree of security. i.e., ensuring that only the intended destination will be capable of receiving and displaying the video signal. Examples of applications which may employ encryption are teleconferences and subscription television. In subscription television systems, the video signal is broadcast and encryption is needed to prevent useful reception of the signal by customers who have not paid the monthly fee. Teleconferences may involve sensitive material such as financial plans, pending business decisions and personal medical data, and the teleconferences may be conducted using some combination of wire, microwave and communications satellites. All of these channels provide opportunities for unauthorized reception and display of the video information.

A number of techniques have been proposed for the encryption of video signals. U.S. Pat. No. 2,846,497 to Kennedy discloses a subscriber television system which employs a binary counter chain at both the transmitting and receiving locations. The binary counter chain is driven by a random signal which is related to the scanning rate of the television screen. Each time the transmitter counter is stepped, a drive tone is transmitted over the sound channel of the television station, and the transmitter counter is randomly reset in accordance with a reset signal which is also transmitted over the sound channel. The drive and reset signals received at the television receiver are employed to drive and reset the receiver binary counter. Both the transmitter and receiver are provided with television raster shifting means for shifting the television raster horizontally and vertically upon reaching various predetermined counts in the transmitter and receiver binary counters.

U.S. Pat. No. 2,875,269 to Ridenour discloses a video scrambling system which operates on the principal of providing an irregular sequence for horizontal scanning of successive fields in the television system. In the Ridenour system, the horizontal sync pulses are counted by a binary counter which establishes a different voltage pattern for each count. Each different voltage pattern is used to generate a different value of vertical deflection current for the video camera, and this value of vertical deflection current selected by the count can be programmed. At each subscriber's television receiver there is located the same apparatus for counting and decoding the horizontal sync pulses. Since the order of the vertical deflection currents being generated is the same, the picture presented on the subscriber receiver is intelligible. Should the program at either the receiver or the transmitter be different the picture presented on the receiver is scrambled.

U.S. Pat. No. 3,081,376 to Loughlin et al discloses a subscription television system wherein the normal or true synchronizing components are synchronized in amplitude to fall within the amplitude range normally set aside for video information, and these synchronizing components are replaced in the transmitted signal by other components having the appearance of the usual synchronizing information but representing false timing data. The coding signal is a sinusoidal component locked to the line frequency and phased to present a peak essentially at the middle of the line-trace intervals, serving as a pedestal for the video component. The false synchronizing signals are, in addition, interrupted from time to time. The decoder at the receiver includes a carrier-frequency modulator to which the received signal is applied in its scrambled form. Correcting signals are also applied to the modulator, and these correcting signals operate on the carrier in effect to remove the coding component.

U.S. Pat. No. 3,116,363 to Doundoulakis discloses a secure television system wherein an audio signal is synchronized with and transmitted with the video signal. The transmitter encoder depresses the horizontal sync signals with a key signal so as to distort the picture, the key signal comprising a substantially sinusoidal wave shape of a predetermined frequency and amplitude modulated on a key signal carrier. The receiver reproduces the audio signal in synchronism with the video and the receiver decoder reconstitutes the horizontal synchronizing signal from the received key signal to provide the required horizontal sync.

U.S. Pat. No. 4,045,814 to Hartung et al discloses a scrambling and unscrambling system for a subscription television wherein control signals are encoded into the vertical blanking intervals of the video signals. The control signals are decoded at the receiver and, if addressed to the particular subscriber's receiver, operate to enable the descrambler or to frequently vary its mode of operation thereby greatly increasing the security of the system.

While these various systems have proven highly useful, there are various disadvantages associated with each. The Kennedy, Ridenour and Hartung et al techniques do not remove the synchronization signals. The Loughlin et al technique suppresses the sync signals but adds a false sync which erases the beginning portion of the active video signal. Loughlin et al also adds a sinusoidal component to the video signal and then transmits a key signal over the audio channel, but the sync signal can be relatively easily restored.

Simple removal of the synchronization signals is not a sufficient security measure, since these signals are relatively easily restored. Modification of the video signal is not always satisfactory since large amounts of an interfering signal may produce an annoying display but much of the picture information remains. Further, complete removal of the interfering signal is often difficult. Other methods such as varying the gain (including signal inversion) present the same difficulty. Signal modification at a rate higher than the line rate is likely to produce visible transient waveforms after attempted removal, and variations at or below the line rate are likely to produce a picture impaired by low level streaks.

There is thus a need for a secure television signal encryption scheme which is easily implemented which requires relatively simple hardware, which does not tamper with the active portion of the video signal and which still provides a significant degree of communications security.

SUMMARY OF THE INVENTION

It is an objection of this invention to provide a technique for encrypting television signals which is both simple and effective.

It is a further object of this invention to provide such an encryption scheme wherein no horizontal synchronization signals are transmitted and wherein the signal format is modified so that the information will be unintelligible even if the horizontal synchronization pulses are restored.

It is a further object of this invention to provide such an encryption technique wherein the signal format in the preferred embodiment described herein, the video signal is provided through a delay unit having eight taps separated from one another by an incremental delay of approximately 1.02 $\mu$s, so that the maximum delay is approximately seven $\mu$s. Horizontal synchronization pulses are removed from the signal, and a reference burst is inserted at a fixed location in the blanking interval. A gating signal selects one tap for each line of the signal, with each tap selection continuing for approximately 53 $\mu$s, i.e.. the duration of the active portion of the signal. Horizontal sync removal can be accomplished by means of a simple sample-and-hold circuit. In the receiver, the horizontal and vertical sync pulses are restored and phase locked to either the Vertical Interval Reference (VIR) signal or to the subcarrier reference burst, the code transmitted during the vertical blanking interval is detected to determine the delay sequence for successive lines, and the signal is supplied through a further tapped delay line with each line being delayed by the complement of the delay in the transmitter so that the total delay will be the same for each line.

BRIEF DESCRIPTION OF THE DRAWINGS

The invention will be more clearly understood from the following description in conjunction with the accompanying drawings in which:

FIG. 2 is a simplified timing diagram illustrating the horizontal blanking interval with time periods expressed in terms of the number of 14.31818 MHz clock pulses;

FIG. 4 illustrates wave forms for explaining the encryption technique according to the present invention:

FIG. 5A illustrates the timing intervals into which a horizontal blanking interval may be separated with a 7-tap delay line used in a preferred embodiment of the present invention;

FIGS. 5(b)–5(i) illustrate the delayed signal as it exists at each of delay taps 0–7 and after removal of the horizontal synchronization pulse;

FIG. 5(j) illustrates a burst insertion gate signal for the encrypted signal according to the present invention;

FIG. 5(k) illustrates an insert blanking gate signal for the encrypted signal according to the present invention;

FIG. 5(m) the timing of the tap selection change in the system according to the present invention;

FIGS. 7(a)–(p) illustrate the encryption of a signal according to the present invention, with FIGS. 7(a), and 7(n) and 7(p) corresponding to FIGS. 5(a), 5(j) and 5(m), respectively, FIGS. 7(b), 7(d) and 7(f)–7(m) illustrating the encrypted signals in the vicinity of the horizontal blanking interval and FIGS. 7(c) and 7(e) illustrating examples of the insert blanking signal of FIG. 5(k);

FIGS. 11(a)–11(e) illustrate the code generation circuitry for use in the transmitter and receiver;

FIGS. 16(a)–16(f) are waveforms for explaining the operation of the circuitry of FIG. 15.

DETAILED DESCRIPTION OF THE PREFERRED EMBODIMENT

Figure 1C:
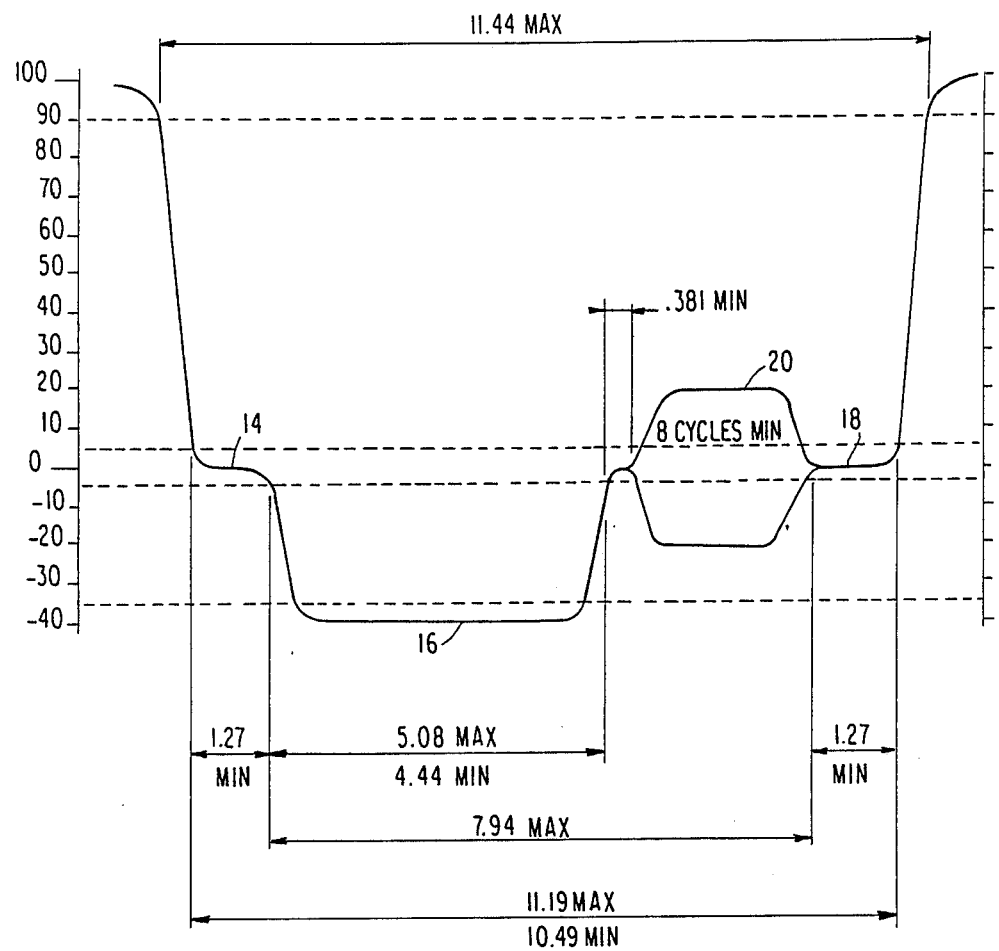
FIG. 1(a) illustrates a portion of a normal television signal wave form during one field.
FIG. 1(b) illustrates a portion of a normal television signal including the vertical blanking interval FIG. I(c) illustrates the FCC specifications for the horizontal blanking interval.
FIG. 1(d) illustrates the Electronic Industries Association (EIA) specifications for the horizontal blanking interval.

FIGS. 1(a) and 1(b) illustrate a normal television signal waveform which, for the purposes of this description, will be considered to be a National Television Systems Committee (NTSC) 525-line television signal. As is well known, the picture is transmitted at a rate of 30 frames per second with each frame including 525 lines of resolution. This translates to a 15.750 kHZ line frequency. As is also well known the 525 lines in each frame are divided into two fields which are scanned in an interleaved manner so that the picture is scanned at a rate of 60 fields per second. The proper interlacing of even and odd fields is accomplished by beginning the even fields at the midpoint of a line.

The video signal includes an active portion 10 containing information to be displayed, and a blanking interval 11 which is used for retrace of the CRT writing beam, transmission of horizontal synchronization pulses to the receiver and transmission of the color subcarrier reference burst. The active portion 10 of the video signal has a duration of approximately 53 $\mu$s and includes luminance and chrominance information modulated onto a color subcarrier having a frequency of 3.58 MHz. At the end of each line, the color signal falls to a level representing black so that during horizontal retrace no video information will be impressed on the screen. During this retrace or "blanking" interval, the signal includes a "front porch" 14 of approximately 1.3 $\mu$s in duration a horizontal line synchronizing pulse 16 of approximately 4.6 $\mu$s in duration, and a "back porch" 18 of approximately 4.7 $\mu$s duration. The horizontal line synchronizing pulse extends into the infrablack region and is therefore, invisible to the viewer. This horizontal synchronizing pulse indicates to the scanning equipment that it is time to return to the left side of the screen to begin scanning the next line in the field.

The numbers given above for the durations of the various portions of the signal are not precise, due to tolerances in the FCC specification for the various periods, and also due to current television receiver designs which have considerable overscan. Most receivers are incapable of displaying the entire 53 μs active portion of the signal, and the average receiver typically displays only about 48 μs of the active portion.

The hue of the color is determined by the phase relationship between the color subcarrier and a reference color burst, and the reference color burst 20 is superimposed on the back porch portion of the blanking interval.

After the first field of 262.5 lines is completed, it is time for the scan to return to the top of the screen and begin the next field. This occurs during a vertical blanking interval illustrated in FIG. 1(b). The signal during the vertical blanking interval includes equalizing pulses having a frequency of twice the line frequency to thereby enable alternate fields to start in the middle of a line, and a vertical synchronizing pulse of much longer duration to synchronize the field scans. Serrations in the vertical synchronization pulse will maintain horizontal line synchronization during the vertical blanking interval. The duration of the vertical blanking interval is approximately 21H, where H represents the horizontal line interval of 63.6 μs.

FIG. 1(c) shows details of the horizontal blanking signal, with time durations derived from the FCC specifications. The FCC specifications measure pulses from the 10% and 90% points of the amplitude. The Electronic Industries Association (EIA) also has a specification which is somewhat easier to use. FIG. 1(d) shows a portion of the EIA specification, which references the 50% point of the pulse amplitude. This is the most useful reference for use in circuit design, since a comparator circuit can be used to determine these points. The time base dispersal video encryption technique according to the present invention may be implemented using digitally generated control signals, with an embodiment described below utilizing a clock frequency of 14.31818 MHz. Other frequencies could be used, although this has been found most convenient.

In the following description, a number of assumptions are made. First, it is assumed that the reference point for the beginning of a line will be derived either from the leading edge or the trailing edge of the horizontal synchronization pulse. Second, the video signal will be sampled at 14.31818 MHz (four times the color subcarrier frequency $f_{sc}$). Finally, the horizontal blanking interval will be 154 clock pulses long. Since the total line length is 910 clock periods wide, the active portion of the line is defined to be 756 clock periods.

These assumptions have been used to develop the simplified timing diagram shown in FIG. 2. In this diagram, the numbers indicate the number of 14.31818 MHz clock pulses assigned to each interval.

The time dispersal encryption method according to the present invention can be more clearly understood with reference to FIGS. 3-8. Briefly in the technique according to the present invention the video signals are encrypted by removing the horizontal synchronization signals and by also reducing the spatial correlation of the picture in the horizontal direction by introducing a pseudo-random time displacement to the active portions of the signal. The simplest method of introducing this time displacement is to alter the starting positions of the various horizontal lines. FIG. 3(a) illustrates a portion of the raster scan of a vertical black bar, and FIG. 3(b) illustrates the black bar as it would be reproduced after the time dispersal encryption and with an external synchronization signal applied to the monitor. In FIG. 3(b), the delays are in increments of 1 μs with a maximum delay of 7 μs.

FIG. 4 is a time domain illustration of the encryption technique. The top line A illustrates the normal signals for horizontal lines 1-6. The illustrated active portions each have a duration of approximately 52.5 μs, with a horizontal blanking interval of approximately 11 μs between each line. The beginning of each of lines 1-6 will then be delayed by zero, four, six, seven, three and one microsecond, respectively, as illustrated at line B of FIG. 4. Since the durations of the active signals have not changed and since the second line has now been delayed by four μs, the interval between the end of the first line and the beginning of the second line will now be approximately 15 μs. The interval between the second and third lines will be approximately 13 μs, since the second line has been delayed by four μs and the third line has been delayed by six, thereby increasing the interval from 11 to 13 μs. The succeeding horizontal blanking intervals will be similarly affected. Upon decryption, each line is further delayed, e.g., line 1, was not delayed during encryption and will now be delayed by 7 μs during encryption, line 2 was delayed by four μs during encryption and will now be delayed by 3 μs during decryption, etc., so that the total delay of each line during both encryption and decryption will be 7 μs and the horizontal blanking intervals will all be returned to the original 11 μs as shown in line C of FIG. 4. Since all lines have now been returned to their original relationships to one another, vertical alignment of the picture elements will be restored and the image, e.g., the black bar in FIG. 3(a), will be displayed in its proper configuration.

FIGS. 5-8 will be used to explain in more detail the concept of the encryption technique according to the present invention. For the purposes of this description, it is assumed that a delay unit is used having eight taps labeled Tap 0 through Tap 7. Each tap represents an incremental delay of approximately 1.02 μs, with Tap 0 providing an undelayed signal. In FIG. 5(a), the timing relationships of the various taps are shown. EOL signifies End Of Line where the active portion of a particular line ends and the horizontal blanking interval begins, and BOL signifies the beginning of an active portion at the end of the horizontal blanking interval. The blanking interval itself, as described above, includes a front porch 14, horizontal synchronization signal 16 and back porch 18 upon which a reference color burst 20 is superimposed, as shown in FIGS. 1(a)-1(d).

FIG. 5(j) illustrates the 4 μs burst insert gate which, as can be seen from a comparison of FIGS. 5a and 5(j), begins 7 μs after the end of a line in the undelayed signal. The function of this burst insert gate will be described in more detail below.

FIGS. 5(b)-5(i) illustrate the input signal as it appears at the respective taps, after the horizontal sync pulse 16 has been removed. The specific technique for removing the horizontal sync pulse is not critical to this invention, but one simple example would be a sample-and-hold circuit which samples the input signal on the front porch 14 and holds this value for a duration exceeding that of the horizontal sync pulse. The different incremental delays for each line of the signal can be easily accomplished by merely switching from one tap to another between each line of the video signal.

In the example shown in FIG. 5, there are seven delay sections of 14 elements, although the number of delay sections is arbitrary and they need not be the same delay. The primary requirement is that the total delay be limited to 7 μs. The three timing diagrams illustrated in FIGS. 5(j)–5(m) represent three control signals. The burst insertion pulse forces a delayed copy of the color subcarrier reference burst to be inserted into the output. In the example shown, this could be accomplished by forcing the delay selection to be Tap 1 during the burst insertion pulse. Alternatively, a separate reference burst delay could be used, and the output connected to this delay.

Figure 6A:
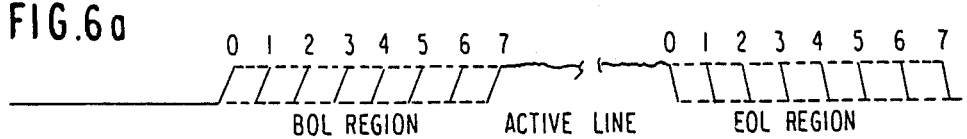
FIGS. 6(a)–6(g) are wave forms for explaining the function of the blanking level insert signal.
Figure 6B:
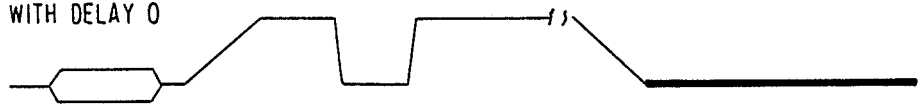
Figure 6C:
Figure 6D:
Figure 6E:
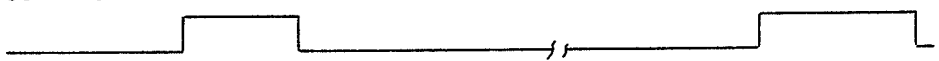
Figure 6F:
Figure 6G:
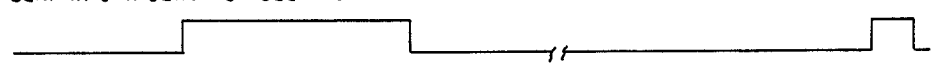

The pulse shown at 5(k) is the command to insert a blanking level. This function is needed to obtain the waveforms shown in FIG. 7, as will be described below. In this example, separate timing for the blanking level insert pulse is required for each of the delay sections, with each pulse filling the gaps between the active line region and the burst insertion pulse. In other words, blanking insertion starts at EOL for a selected delay, and ends at the start of the burst insertion. Blanking delay also starts at the end of the burst insertion and ends at the BOL for the next selected delay. FIGS. 6(b)–6(g) illustrate blanking insert pulses for three different delays (FIG. 6 (a) showing a timing line), with FIGS. 6(b), 6(d) and 6(f) showing the delayed video signal and FIGS. 6(c), 6(e) and 6(g) showing the corresponding insert blanking signals, respectively. (It should also be noted that the blanking level should be inserted during the vertical blanking interval to remove synchronization pulses that occur there.)

The signal shown in FIG. 5(m) illustrates that the delay selection can start any time during the burst insertion pulse.

FIGS. 7(a)–7(p) illustrate an example of a sequence of lines encrypted using seven delay sections, with only the horizontal blanking interval being shown. FIGS. 7(a), 7(n) and 7(p) correspond to FIGS. 5(a), 5(j) and 5(m), respectively. The purpose of the 4 μs burst insert gate illustrated in FIGS. 5(j) and 7(n) becomes more clear from a comparison of the various waveforms of FIGS. 5 and 7. Returning for a moment to FIG. 5, and specifically to FIGS. 5(g) and 5(d), and assuming for the moment that no burst insert gate were provided, if line N were taken from Tap 5 as shown in FIG. 5(g), the succeeding line (N+1) could be not be taken from Tap 2 as shown in FIG. 5(d), since the BOL at Tap 2 occurs during the reference color burst of Tap 5. Thus, if the tap selection were switched from Tap 5 to Tap 2 at the beginning of the line at Tap 2, a portion of the reference color burst at Tap 5 would be lost, and if the tap selection were switched only after the reference color burst of Tap 5 were complete, a portion of the active signal at Tap 2 would be lost. As a result, the delay of any particular selected line N could be less than the delay of the previous line N−1, but only if the difference in delays did not exceed the unused portion of the back porch 18 which follows the reference color burst in line N−1. For example, although the selection of any one of Taps 0-2 could not follow the selection of Tap 5, it would be possible to follow the selection of Tap 5 with any one of Taps 3, 4, 6 or 7.

This constraint upon the selection of delay taps for successive lines is quite undesirable from the standpoint of introducing a pseudo-random delay. In order to avoid this constraint, the reference color burst is inserted at a fixed location in the blanking interval, regardless of the particular tap being selected. This fixed location extends from 7 to 11 μs after the end of a particular line in the signal. As shown in FIGS. 5(c) and 5(j), the reference color burst at delay Tap 1 will occur during this interval and, thus, the burst insert gate signal illustrated in FIG. 5(j) can be used to enable the selection of Tap 1 regardless of the tap which is otherwise being selected for incremental delay purposes.

FIGS. 7(b), 7(d) and 7(f)–7(m) illustrate one example of a pseudo-random sequence of incremental delays for a number of successive signal lines, with FIGS. 7(c) and 7(e) showing two examples of the variable-timing Insert Blanking signal of FIG. 5(k). The sequence of tap selections, as shown at the left-hand edge of each of FIGS. 7(b), 7(d) and 7f)–7(m) is D0, D4, D6, D7, D3, D1, D5, D2 and D7. A comparison of FIGS. 5(b) and 7(b) illustrates that the reference color burst of the input signal, which originally began approximately 6 μs after the EOL for Tap 0, has been removed and replaced with the reference color burst of Tap 1. This insertion of the reference color burst from Tap 1 is accomplished by merely enabling the selection of Tap 1 for a 4 μs interval beginning 7 μs after the end of the undelayed line. At the end of this short interval of the selection of Tap 1, the tap selection is changed to that for the succeeding line, in this case Tap 4. Referring next to FIG. 7(d), it is seen that the selection of Tap 4 continues until approximately 4 μs after the EOL of the undelayed input signal, at which time the blanking level is inserted for three μs, followed by the selection of Tap 1 to insert the reference color burst, and the tap selection is than changed to that (T6) for the succeeding line. This tap switching continues as shown in FIGS. 7(f)–7(m) with the reference color burst being inserted at the same fixed location in every horizontal blanking interval. Since the reference color burst will not begin until 7 μs after the EOL of the undelayed input signal incremental delays of up to 7 μs are possible without losing any portion of the active signal of a previous line. Since the reference color burst insert gate always terminates at the BOL of the undelayed input signal, no portion of the active period of any signal will be lost regardless of which tap is selected.

As can be seen from the above, the encryption of the video signal is accomplished by selectively enabling any one of eight Taps 0-7 separated by approximately 1.02 μs of incremental delay. During a 4 μs interval beginning 7 μs after the EOL of the undelayed input signal, Tap 1 is selected and superimposed on the otherwise selected tap in order to insert the reference color burst into the delayed signal at a fixed location with respect to the undelayed input signal. The fixed location of the reference burst allows a low-cost receiver to use simple circuits for regeneration of timing and control signals. Only the active picture elements in each line are transmitted by selecting a different gating signal for each tap output. The simplest technique for implementation may be to provide a first tap selection control signal for selecting a tap during the burst gate insertion and to maintain this tap selection for a complete line interval, i.e., 63.5 μs. The burst insert gate signal can be used to override the normal tap selection, and the Insert Blanking signal can be used to superimpose the blanking level on the selected tap output.

Figure 8:
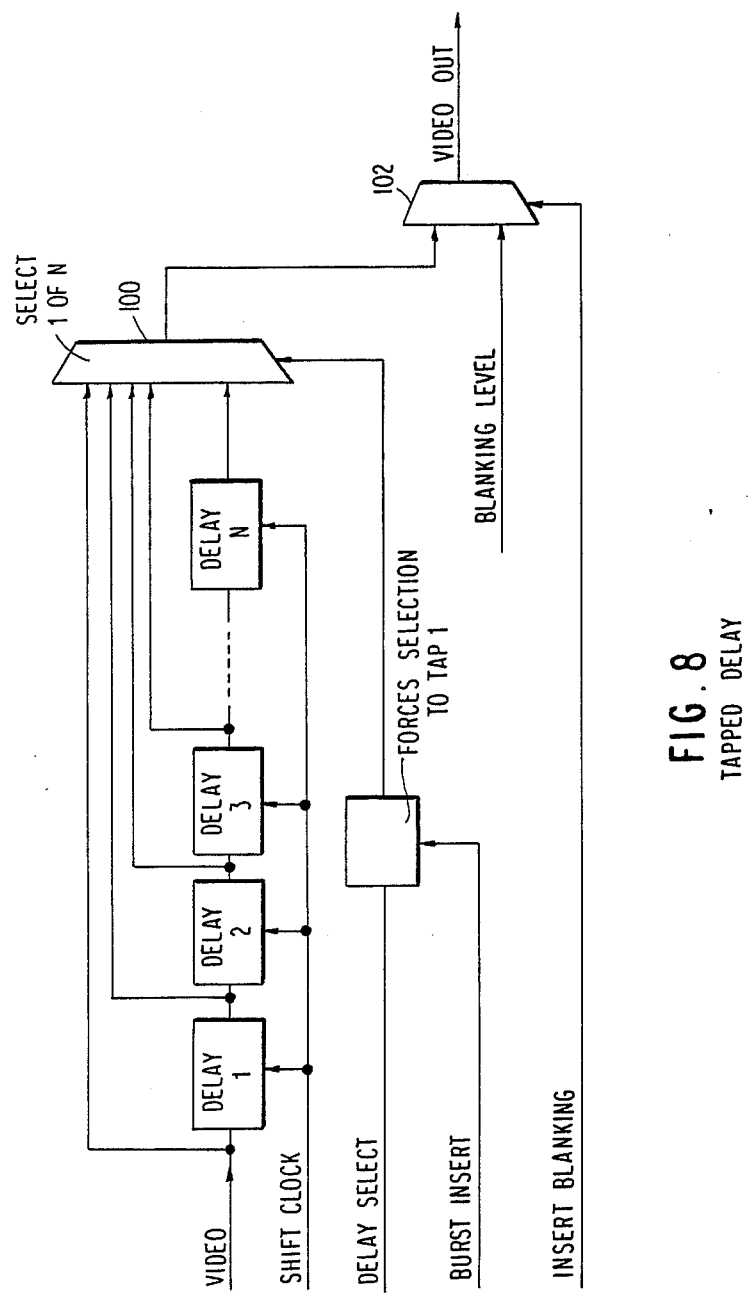
FIG. 8 is a brief diagram of one example of a delay unit circuit for use in the present invention.

FIG. 8 is a functional block diagram of a tapped delay configuration for implementing the encryption scheme illustrated in FIGS. 5-7. The major components are a set of delay sections, a one-of-n selector (multiplexer) 100 and a blanking insertion selector 102. This circuit could be implemented with digital signals or with analog signals. For the digital implementation, the delay sections would be constructed with latches or flip-flop circuits, and the selectors would be multiplexers constructed with gates. For analog signals, the delay sections could be CCDs and the selectors would be analog multiplexers. Each could be implemented in LSI form.

Figure 3A:
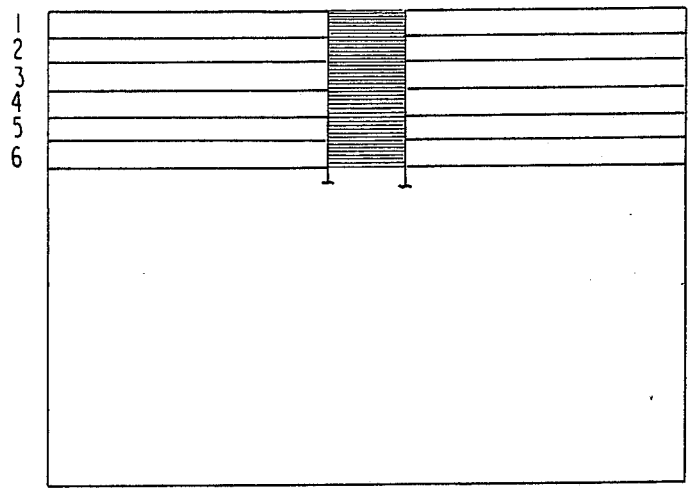
FIG. 3(a) illustrates a portion of the raster scan of a vertical black bar.
Figure 3B:
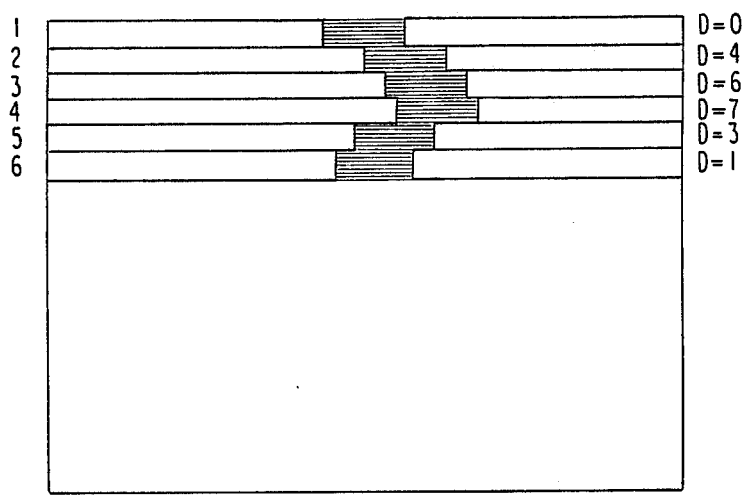
FIG. 3(b) illustrates the black bar of FIG. 3(a) as it would be reproduced after encryption according to the present invention but without a proper decryption operation.
Figure 9:
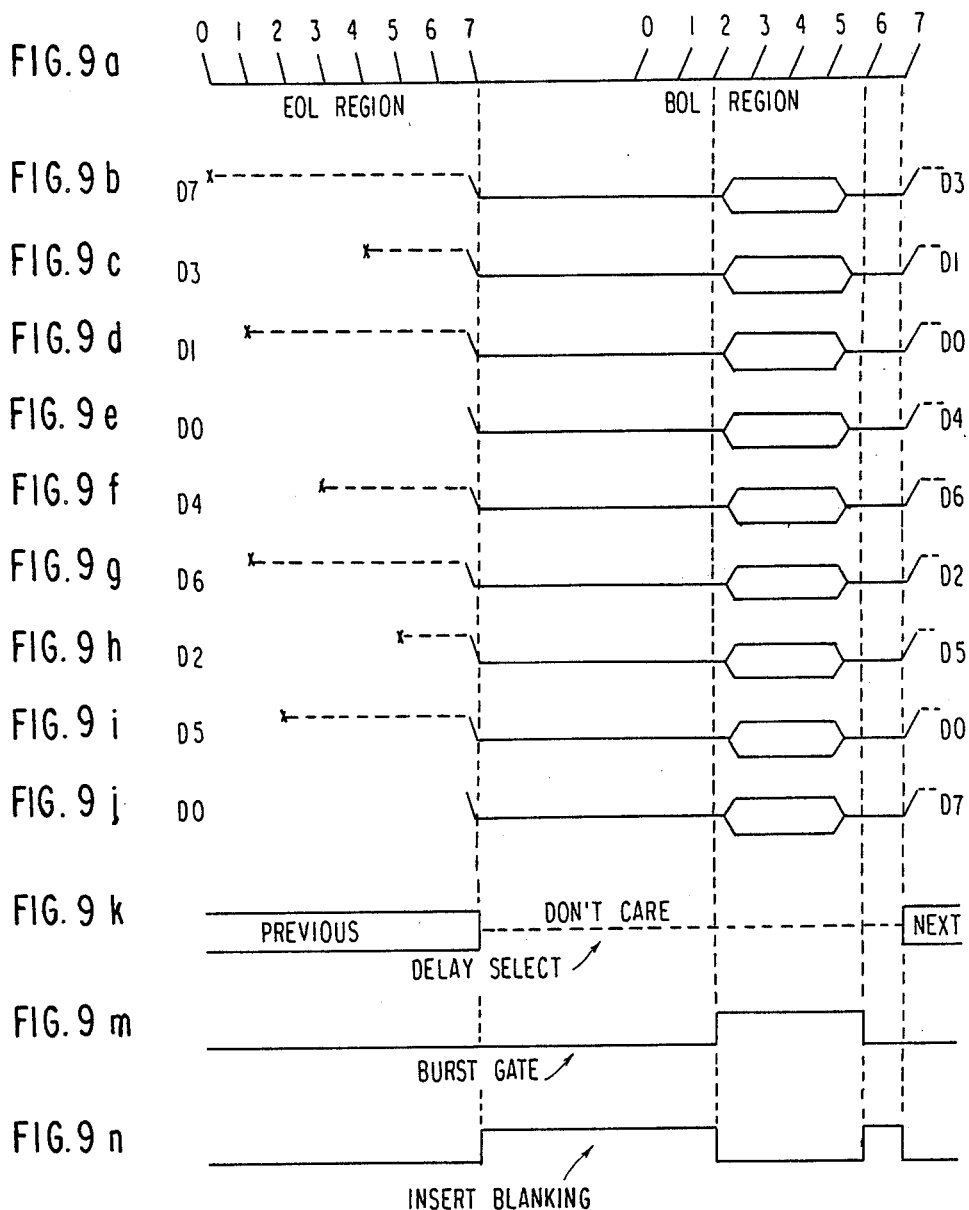
FIGS. 9(a)–9(n) are wave forms for explaining the decryption process of the present invention.

The decryption of the video signal can be understood with reference to FIGS. 9(a)-9(n). Successive lines in the encrypted video signal have been incrementally delayed with the reference color burst inserted at a fixed location, all as described and illustrated with reference to FIG. 7, and with different delays for each line, the picture would be displayed as illustrated in FIG. 3(b). In order to display the image in its proper form, the delays for each line could be removed, or a simpler alternative would be merely to adjust the various delays to equal values so that the lines will each be vertically aligned once again. In the example being described, the maximum delay for any one line of the encrypted signal is 7's, and a simple manner of restoring the vertical alignment of adjacent lines would be to once again delay each line by the 7 $\mu$s complement of its original delay. For example, for encryption delays D0, D4, D6, D7, D3, D1, D5, D2 and D7 as illustrated in FIG. 7, the decryption delays would be D7, D3, D1, D0, D4, D6, D2, D5, D0, respectively, so that the total delay during encryption and decryption for any given line would be approximately 7 $\mu$s. In the encrypted signal, only the active portion of each line has been delayed, and the reference color burst is present at a fixed location. Thus, delaying upon decryption will restore the vertical alignment of the active signal portions but will destroy the alignment of the reference color burst signal. Accordingly, upon decryption, the reference color burst is again removed from the received signal and inserted at a fixed location in the decrypted signal. The correct timing for the reference burst can be obtained by selecting Tap 6 at the decrypter. The original signal is thus reconstructed by selecting a tap for each line which is the 7's complement of the tap selected during encryption. For the fist line in FIG. 9, Tap 7 is selected at the BOL and continued for 59.5 $\mu$s after which Tap 6 is selected for 4 $\mu$s for insertion of the reference color burst. At the end of the reference color burst, Tap 3 is selected for 59.5 $\mu$s followed by a 4 $\mu$s selection of Tap 6 and then a 59.5 $\mu$s selection of Tap 1, etc. While each tap selection lasts for 59.5 $\mu$s, the Insert Blanking signal of FIG. 9(n) superimposes the blanking level on the selected tap output as described above. The vertical alignment of each line will then be restored as shown in FIGS. 9(b)-9(j), and horizontal synchronization pulses will then be inserted to restore the video signal to its original form for display by conventional equipment.

It will be seen from FIG. 9 that the delay selection can be changed anywhere within the horizontal blanking interval, since the selection is in effect overridden by the burst gate and insert blanking signals where appropriate. It will also be noted that the Insert Blanking signal used for decryption is a constant signal, rather than the variable signal used during encryption.

Finally, it should be noted that the delay periods during decryption are the complements of the encryption delay periods, but it need not necessarily be the 7's complement. It could instead be any complement so long as the total delay for each line during encryption and decryption is the same for all lines.

Figure 10:
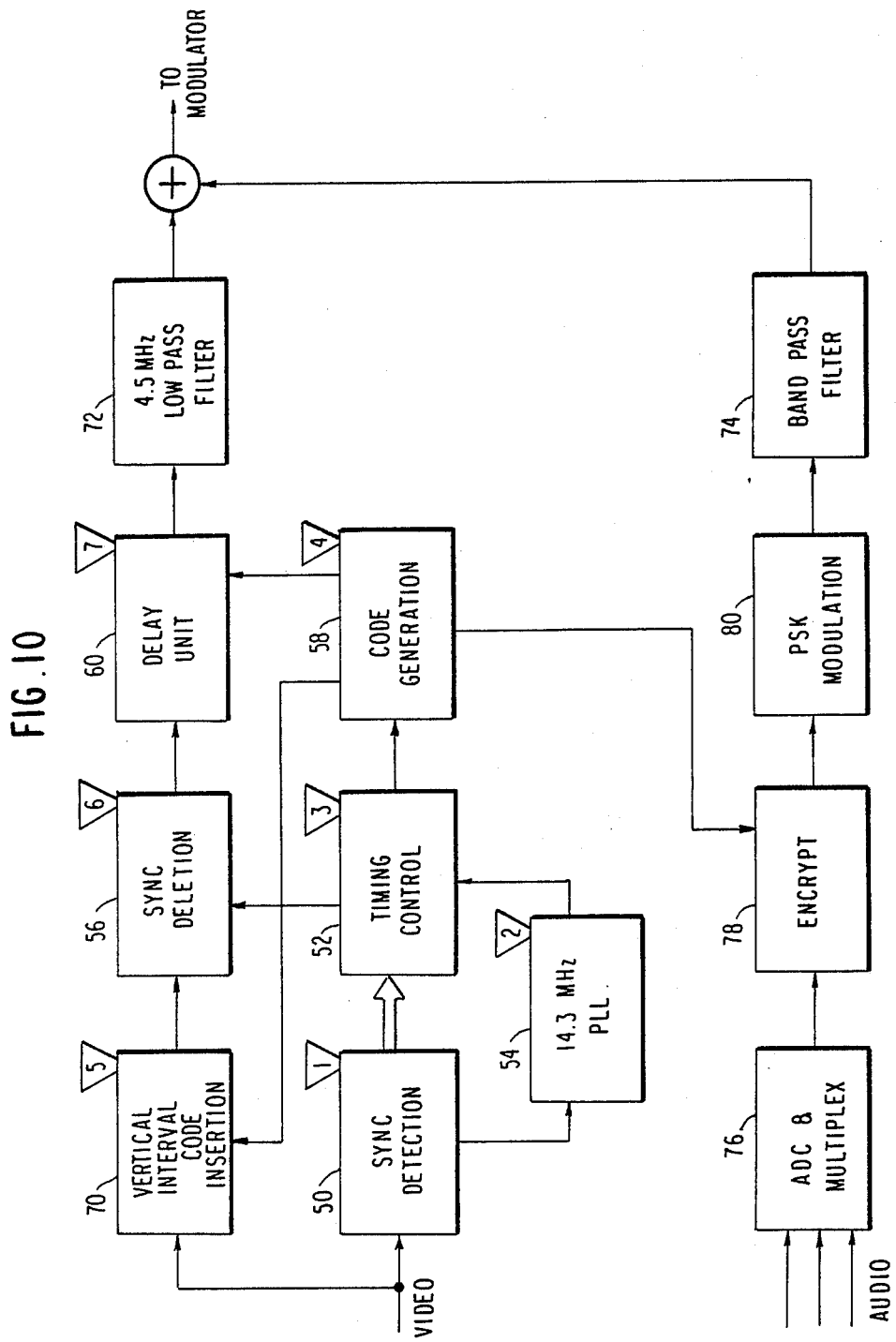
FIG. 10 is a block diagram of one example of an encryption portion of a video transmitter according to the present invention.

FIG. 10 is a block diagram of the encryption portion of a video transmitter according to the present invention. The sync detection circuit 50 receives the video signal and detects the horizontal and vertical synchronization in a well known manner. The sync detection circuit 50 provides horizontal sync, odd vertical sync, even vertical sync and burst gate signals to the timing control circuit 52 and passes the video signal, or at least the Vertical Interval Reference (VIR) portion thereof, to the clock generation circuitry 54. The clock circuitry 54 is a phase lock loop (PLL) circuit which generates a 14.318 MHz clock signal (four times the 3.58 MHz color subcarrier frequency $f_{sc}$) which is phase locked to the VIR signal. The 14.318 MHz clock signal from circuit 54 serves as the reference for all signals needed by other units in the transmitter.

Timing control circuit 52 receives the 14.318 MHz clock signal from the clock circuit 54 as well as appropriate sync signals from the detection circuit 50 and generates the various timing control signals necessary in the system. In its simplest form, the timing control circuitry 52 may comprise merely a plurality of counters and decoders for providing the appropriate signals, e.g., with a line frequency of approximately 15.75 kHz there are approximately 910 pulses per line, and a counter within circuit 54 may provide an output signal to the sync deletion circuit 56 every 910 pulses. To ensure that the sync deletion signal occurs at the appropriate time within each horizontal blanking interval, the counter which provides the sync deletion signal may be synchronized with the horizontal sync signal provided to the timing control circuit 52 from the sync detector 50. Additional counters and/or decoders in the control circuit 52 identify lines in the vertical interval. Also, with the help of the horizontal sync signal received from the sync detector 50, the timing control circuit 52 will provide to the code generation circuitry 58 a signal every 910 clock pulses which is synchronized to the BOL. This signal can be used by the code generation circuitry 58 to change the tap control signal provided to the delay unit 60. After 59.5 $\mu$s or approximately 852 clock pulses, a counter in either control circuitry 52 or code generation circuitry 58 will provide a signal having a duration of 4 $\mu$s, or approximately 57 pulses, indicating that Tap 1 should be selected for the purpose of burst gate insertion.

The code generation circuitry 58 could be implemented in a number of ways, with a simple example being schematically shown in FIG. 11(a). As shown in FIG. 11(a), the code generation circuit 58 could comprise a PN sequence generator 150 of a type well known in the art, e.g., a recirculating shift register with feedback logic combining selected stages of the shift register. Also included would be circuitry 152 for setting the initial state of the sequence generator 150 to a desired value. The value could be constant for successive resets, or it could be changed for increased security. The provision of the reset value to the circuit 152 could be implemented in a straightforward manner and need not be described in detail herein.

As shown in FIGS. 11(b)-11(d), the load signal (FIG. 11(d)) would be provided to the sequence generator 150 from the timing control circuit 52 during each vertical blanking interval to cause the sequence generator to load the value in the state control circuit 152. This value would also be provided to the code insertion circuit 70

(FIG. 10) to be transmitted to the receiver in the vertical blanking interval. At the end of the vertical interval, the horizontal sync pulses would be provided to the sequence generator to step the sequence generator through its sequence, with selected bits (e.g., three bits in the case of an eight-tap delay unit 60) being provided to the circuit 104 (FIG. 8) within the delay unit 60, where it would be combined with the burst insertion gate to control the tap selection.

The video signal provided to the sync detection circuitry 50 is also provided to a vertical interval code insertion circuit 70, as described above, where the starting state at which the sequence generator is to begin for the next field is inserted into the vertical blanking interval. This will enable the receiver to determine the exact pseudo-random delay sequence used in the transmitter so that, at the appropriate time, a similar sequence generator in the receiver (e.g., as shown in FIG. 11(e)) can be preset to the same value so that the sequence can be reset to the same starting state to thereby duplicate the sequence used in the transmitter.

The length of the code to be inserted in the vertical interval is dependent upon the complexity of the sequence generating circuitry. In the example shown in FIG. 11(a), the code would have to include a number of bits equal to the number of bits in shift register used in the sequence generator 150. The code would be inserted in several of the unused lines in the vertical interval. The vertical interval lasts for approximately 19 lines, with lines 18 and 19 containing the VIR signal. As shown in FIG. 1(b), a total of 9 lines in the vertical interval are required for the vertical pulse sync interval and the preceding and following equalizing pulse intervals. Thus, there are approximately 8 unused lines in the vertical interval between each field. With each line lasting approximately 63.5 μs, up to 200 pulses per line could be used for transmission. The pulses would preferably be of a sinesquared shape with a 0.25 μs duration at the half amplitude level due to the resulting frequency spectrum. With the horizontal, odd vertical and even vertical sync signals provided to the timing control 52 from the sync detection circuit 50, it would be a simple matter to derive the appropriate timing signals to insert the code into the proper lines in the vertical interval. The particular technique used to insert the code in the video signal could be any one of a number of techniques well known in the art.

After deletion of the horizontal sync signal in deletion circuitry 54, the video signal would be supplied to the delay unit 60. This delay unit 60, an example of which is functionally illustrated in FIG. 8, could be implemented in a variety of ways, and may preferably comprise a CCD (charge coupled device) delay line which would allow the amount of delay to be accurately determined by the 14.318 MHz clock. Delays of up to 7μs are possible if the reference color burst is to be retained, as described above with reference to FIGS. 5-7, and delays of up to 10 μs would be possible if the entire horizontal blanking interval is used, i.e., if the reference color burst is deleted entirely from the transmitted signal and the PLL circuit uses the VIR signal as its reference.

The 4.5 MHz low pass filter 72 is provided to reduce high frequency spurious signals and to prevent interference with the output of bandpass filter 74. The output of low pass filter 72 essentially comprises the encrypted video signal.

If desired, the audio portion of the signal can also be encrypted as shown in the lower portion of FIG. 10. The audio signal would be received by an Analog to Digital Converter (ADC) 76, a digital encryption circuit 78 which would encrypt in accordance with the multi-bit code from generator 58 in a well-known manner, a phase shift keying (PSK) modulation circuit 80 and bandpass filter 74. The output of bandpass filter 74 is a carrier that can be combined with the video signal prior to modulation for transmission over a communications link.

Figure 12:
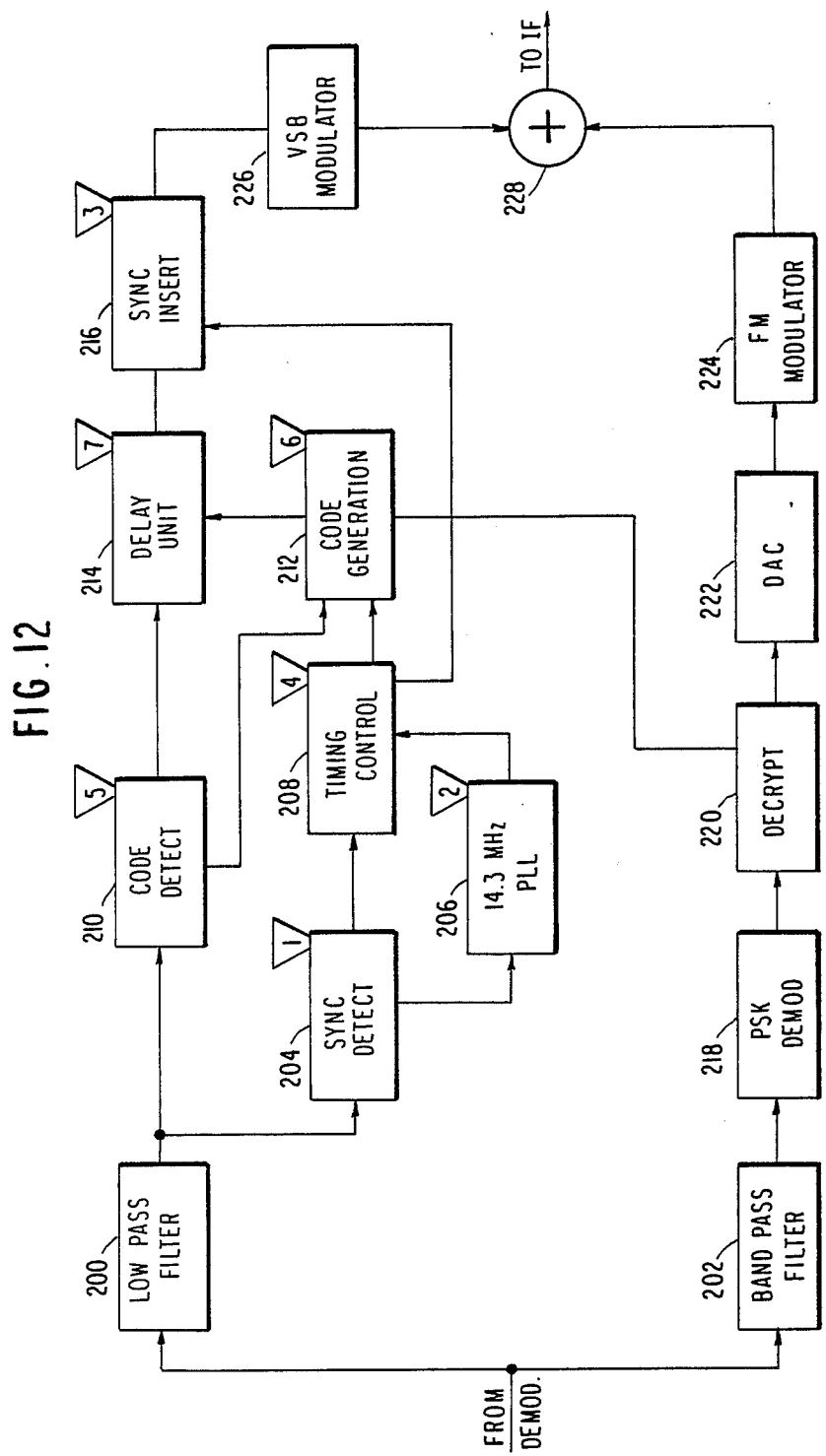
FIG. 12 is a brief block diagram of the decryption portion of a video signal receiver according to the present invention.

The receiver, a block diagram of which is shown in FIG. 12, essentially reverses the encryption process.

The demodulated, encrypted video signal is supplied to a low pass filter 200 and bandpass filter 202 which separate the video and audio portions, respectively. In addition to the active video portion, the encrypted video signal includes only vertical sync signals. The sync detector 204 detects the 2H signals, the H signal and the detected vertical sync during the vertical interval (lines 1-18 of each field). If the encrypted signal does not include the reference color burst, the VIR signal can be used as a reference for the PLL circuit 206, since the VIR signal includes a color subcarrier signal. Once again, timing and control circuit 208 can simply comprise a plurality of counters and decoders which generate appropriate timing control signals synchronized to the 14.318 MHz clock from clock circuitry 206.

Code detection circuitry 210 detects the code inserted in the vertical interval and provides this code to the code generation circuit 212. In the example given above utilizing a sequence generator such as shown in FIG. 11(e), the code provided to the code generation circuit 212 from the code detection circuit 210 would inform the code generation circuitry of the value to which the sequence generator is to be preset before the end of the vertical interval or, if desired, some other time at which the sequence generators are to be synchronously reset. The code generation circuitry 212 is then clocked by timing control 208 at the same frequency as the sequence generator in the transmitter, so that the same sequence of control signals to the delay unit 214 will be generated. The taps on the delay unit 214 in the receiver are, of course, reversed with respect to those in the transmitter, so that the 7's complement of the transmit delay will be provided in the receiver as described above with reference to FIGS. 5-7.

The output of delay unit 214, which comprises vertically aligned horizontal lines each of which are delayed by the same amount, is provided to the sync insertion circuit 216 where, at the appropriate time as determined by the timing control circuit 208, the horizontal sync pulse is inserted into the horizontal blanking interval. If the color subcarrier reference burst has been entirely deleted from the encrypted signal, this can be easily inserted at the same time as the horizontal synchronization pulse. The output of the sync insertion circuitry 216 comprises the restored video signal.

In the audio channel, the sequence of operations in the transmitter is reversed, with the output of the bandpass filter 202 being demodulated in a PSK demodulator 218, decrypted in accordance with the code provided from code generator 212 to the decryption circuit 220, and converted to analog form in a D/A converter 222. The remaining circuits, i.e. the audio frequency modulator 224, vestigial sideband modulator 226 and signal combiner 228 operate in a well known manner to combine the audio and video signals into a form suitable for a conventional television set.

The above-described embodiment of the invention provides a simple and effective means of encrypting video signals. If a PN sequence generator (a "reset sequence generator") is used to generate the succession of reset values for the state control circuit 152 in FIG. 11(a), the code sent during the vertical interval would change from field-to-field but would eventually repeat, with the length of the pseudo-random sequence being determined by the length of the shift register used in the reset sequence generator. A variation of the described embodiment would be to utilize the output from the sequence generator 150 to address a programmable memory rather than being provided directly to the tap control. The programmable memory would then provide its own pseudo-random sequence in accordance with the pseudo-random sequence of address inputs received from the code generator. The correspondence between the generated address sequence and the output of the memory could be changed on a monthly basis with subscribers receiving a magnetically encoded card identifying the "code of the month". The card could be inserted into the receiver unit and remain there for the duration of the program, with the information on the card corresponding to the particular code of the month but not carrying the code itself. In a further improvement, the sequence generator of FIG. 11(a) could be done away with entirely, and a plurality of pseudo-random sequences could be programmed into a single memory chip, with the magnetically encoded card indicating to the receiver which of the programmed sequences should be used for any particular month.

It will be appreciated that various changes can be made to the embodiment described above without departing from the spirit and scope of the invention. For example, rather than using a custom integrated circuit for the delay line in the transmitter and receiver, the invention could be implemented using a pair of conventional CCD delay lines each having 910 elements corresponding to one horizontal line interval. This will be described with reference to FIGS. 13 and 14.

Figure 13:
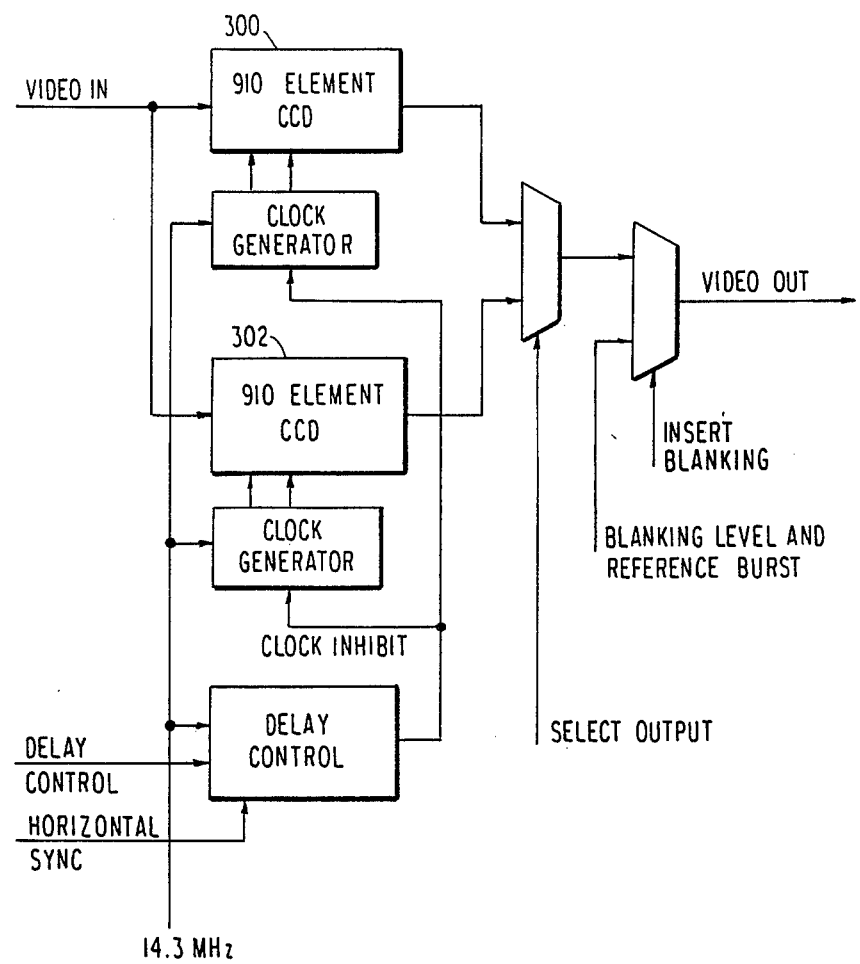
FIG. 13 is a diagram of a CCD implementation for the delay unit of the present invention.

FIG. 13 shows a block diagram of a delay unit that can be constructed with readily available analog CCD delay lines. Each delay line 300, 302 contains 910 delay elements and, if clocked at 14.31818 MHz, provides exactly one line of delay. These delay lines typically use a two phase clock, one to strobe in data, and the other to cause a transport of data from one cell to the next. The transport clock can be inhibited for short portions of time to introduce delay. Digital delay lines could be used as well, where the delay cells would be constructed of digital delay elements, and the primary change in FIG. 13 would be the indication that the input and output have enough bits to store the signal (normally 6 to 8 bits wide).

Figure 14:
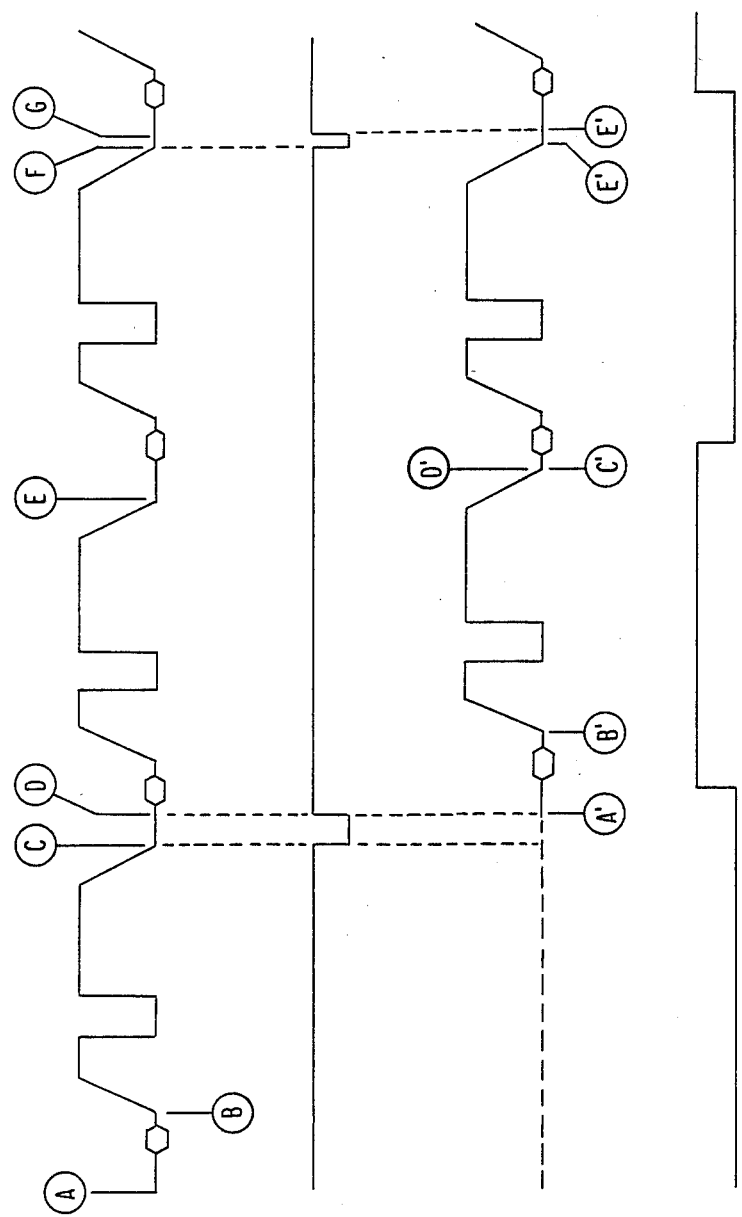
FIGS. 14(a)–14(d) are waveforms for explaining the operation of the circuitry of FIG. 13.

Operation of the delay lines is as follows:

a. Any signal that is clocked into a delay line will appear at the output after 910 clock pulses have been applied to the unit.

b. The output of one delay line will be selected at a time. Data from the other line is ignored.

c. The operation of the unit can be seen by examining FIG. 14. FIG. 14(a) shows three lines of video that might be applied to the input. FIG. 14(b) shows a transport clock enable signal. Shift clocks are applied when the signal is high, and are inhibited when the line is low. FIG. 14(c) shows the output from the delay line. The samples marked A, B, and C are the beginning of the blanking interval beginning of line, and end of line for line n. Clock pulses will be inhibited during the interval between samples C and D.

In the output waveform of FIG. 14(c), the corresponding samples are indicated with primes. When the delay line input is receiving sample C, the output is providing sample A'. When the clock pulses are interrupted between samples C and D at the input, the output at sample A' is repeated until clocks resume. The waveform then resumes, and the portion from A' through C' is a delayed replica of line n. The delay is equal to one line plus the width of the inhibit pulse.

The samples from C through D were not stored in the delay line, so that C' and D' are adjacent. The samples from D' to E' are therefore delayed by exactly one line from the corresponding samples in line n+1. This shows that relative delay introduced by inhibiting clock pulses continues for exactly one line, then disappears.

d. The output of the delay line is selected during the period shown in the waveform of FIG. 14(d).

Other circuit elements needed for this CCD delay line implementation are similar to those described for the tapped delay implementation. This includes the blanking level insertion and burst insertion.

Figure 15:
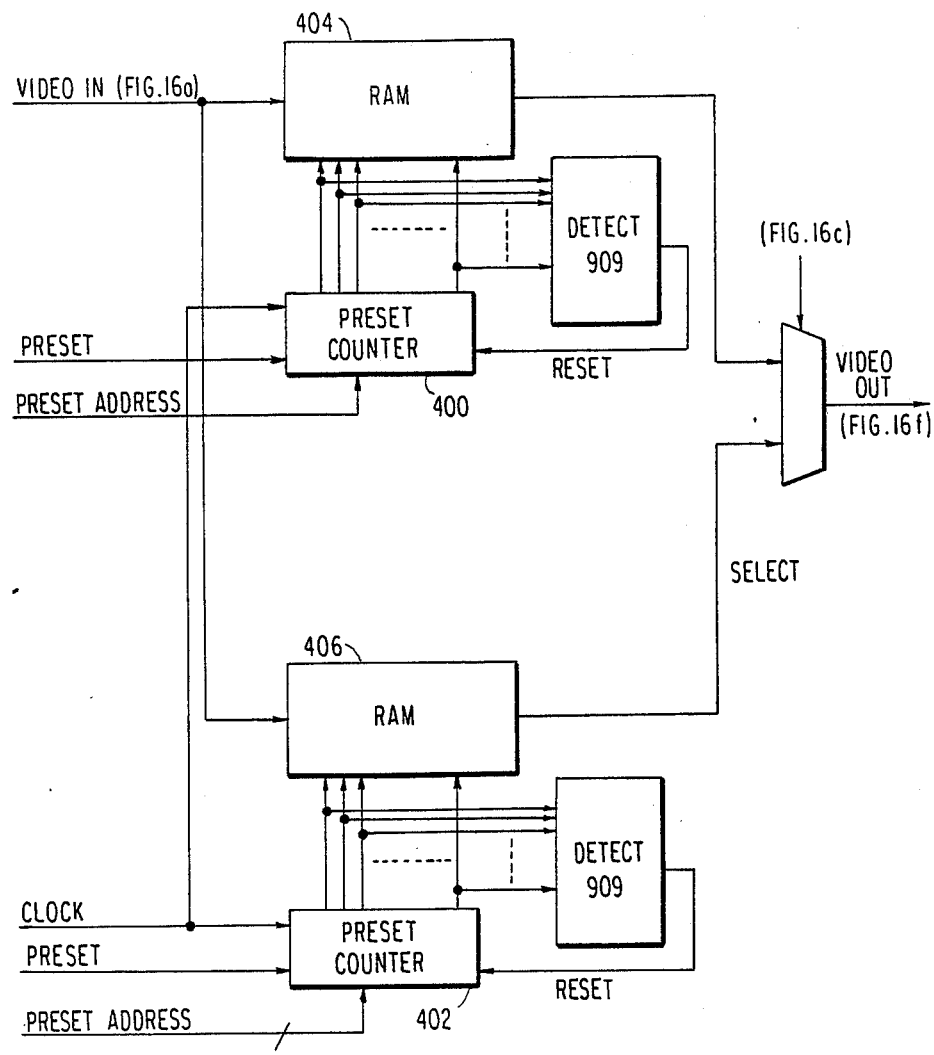
FIG. 15 is a diagram of a RAM implementation for the delay unit of the present invention.

A further alternative would be to implement the system of the present invention using RAM-based delay. FIG. 15 shows a block diagram of a delay unit that is constructed using RAM (random access memory) for the digital circuit elements. One distinguishing feature is the presence of counters 400, 402 used to access to the memories 404, 406. The circuit of FIG. 15 will mimic the operation of the circuit of FIG. 8 if the counter is allowed to simply count from 0 to the length of the line (910). Additional control is possible with this design when provisions are included for external preset of the counter.

This implementation is so flexible that several modes of operation are possible. One example of use is as follows, with reference to FIG. 15 and the timing diagrams of FIG. 16.

The delay unit is operated in two modes. First, the video data is stored in RAM 404 for one horizontal line. The write phase starts at the beginning of the horizontal blanking interval, where the counter 400 is preset to 0 and the write enable signal (FIG. 16(b)) goes high, the write phase continuing until the next horizontal blanking interval. The write phase is then disabled, and the data is taken from the output.

The counter 400 is immediately preset to the beginning of the reference burst period (a count value of 88), and a gated clock is used to read out the reference color burst. For this example, the burst period is assumed to be 56 clock periods wide. After this period, the clocks are inhibited for the duration of the desired delay period.

The counter is then preset to the start of the active line (154), and the next 756 samples are read from memory. The clocks are then inhibited for the remainder of the line.

The second memory 406 is provided so that one line can be written into one of the memories while the previous line is being read out of the other memory, thereby providing continuous output data.

The disclosed invention provides a variety of advantages. First, digital coding can be applied to the control of the pseudo-random delay sequence, and this provides flexibility to match many applications. Second, the amount of delay is determined by a stable reference frequency, and this reduces problems with matching transmitter and receiver delays. Third, security is increased by this method since the receiver circuits will be unable to function with the sync removed and, even if an economical method of achieving synchronization is found, the picture is still of low intelligibility due to the line displacement.

We claim:

1. A method of encrypting video signals of the type comprising a plurality of lines each having an active signal portion representing a line of image to be displayed, with the active signal portions of successive lines of an original video signal being separated from one another by horizontal blanking periods including a horizontal synchronization pulse, said method comprising:

removing said horizontal synchronization pulses from each horizontal blanking period;

delaying the active signal portion of each line with respect to said original video signal by a respective delay period less than the duration of a horizontal blanking period; and periodically changing said delay period.

2. A method as defined in claim 1, wherein said step of periodically changing said delay period comprises changing said delay period between successive lines.

3. A method as defined in claim 2, wherein said video signal includes successive fields of plural lines, and wherein the active signal portions of successive lines in a field are delayed in accordance with a pseudorandom sequence of delay periods.

4. A method as defined in claim 1, wherein said video signal includes successive fields of plural lines, and wherein each field includes a first portion representing an image to be displayed said method further comprising the steps of:

generating a sequence code identifying the sequence of delays to be imparted to the active signal portions of successive lines in a particular field; and transmitting said sequence code with said video signal prior to the first portion of said particular field.

5. A method as defined in claim 2, wherein said video signal includes successive fields of plural lines, and wherein each field includes a first portion representing an image to be displayed, said method further comprising the steps of:

generating a sequence code identifying the sequence of delays to be imparted to active signal portions of successive lines in a particular field; and transmitting said sequence code with said video signal prior to the first portion of said particular field.

6. A method as defined in claim 1, wherein said video signal further includes a color reference burst following said horizontal synchronizing signal in said horizontal blanking period, said method further comprising the step of shifting said color reference burst to a predetermined position within each horizontal blanking period regardless of the delays imparted to the active signal portions of lines before and after each said horizontal blanking period.

7. A method as defined in claim 2, wherein the maximum delay imparted to the active signal portion of any one line is approximately seven microseconds.

8. A method as defined in claim 2, wherein said video signal further includes a color reference burst following said horizontal synchronizing signal in said horizontal blanking period, and wherein the maximum delay imparted to the active signal portion of any one line is equal to the duration of a horizontal blanking period less the duration of said color reference burst.

9. A method as defined in claim 8 further comprising the step of shifting said color reference burst to a predetermined position within each horizontal blanking period regardless of the delays imparted to the active signal portions of lines before and after each said horizontal blanking period, said shifted color reference burst beginning said maximum delay period after the end of the active signal portion of an undelayed line of said video signal.

10. A method of securely transmitting video signals from a transmitting station and receiving said video signals at a receiving station, said video signals being of the type including a plurality of lines each having an active signal portion representing a line of image to be displayed, with the active signal portions of successive lines of an original video signal being separated from one another by horizontal blanking periods including a horizontal synchronizing pulse, said method comprising:

removing said horizontal synchronization pulse from each horizontal blanking period;

delaying the active signal portions with respect to said original video signal by different delay periods less than the duration of a horizontal blanking period to obtain an encrypted video signal;

transmitting said encrypted video signal to said receiving station; and at said receiving station, delaying the active signal portions of the encrypted video signal by a delay period which is the complement of the delay imparted to each active signal portion at said transmitting station to thereby obtain a decrypted video signal.

11. A method as defined in claim 10, wherein said first delaying step comprises changing said delay period between successive active signal portions.

12. A method as defined in claim 10, wherein said video signal includes successive fields of plural lines, and wherein said first delaying step comprises delaying the active signal portions of successive lines in a field in accordance with a pseudorandom sequence of delay periods.

13. A method as defined in claim 10, wherein said video signal includes successive fields of plural lines, and wherein each field includes a first portion representing an image to be displayed, said method further comprising the steps of:

generating a sequence code identifying the sequence of delays to be imparted at said transmitting station to the active signal portions of successive lines in a particular field;

transmitting said sequence code with said encrypted video signal prior to the first portion of said particular field;

detecting said sequence code at said receiving station: and delaying the active signal portions of said encrypted video signal in accordance with said sequence code.

14. A method as defined in claim 11, wherein said video signal includes successive fields of plural lines, and wherein each field includes a first portion representing an image to be displayed, said method further comprising the steps of:

generating a sequence code identifying the sequence of delays to be imparted at said transmitting station to successive lines in a particular field; and transmitting said sequence code with said encrypted video signal prior to the first portion of said particular field.

15. A method as defined in claim 10, wherein said video signal further includes a color reference burst following said horizontal synchronizing signal in said horizontal blanking period, said method further comprising the step of shifting said color reference burst to a predetermined position within each horizontal blanking period regardless of the delays imparted to the active signal portions of lines before and after each said horizontal blanking period at said transmitting station.

16. A method as defined in claim 11, wherein the maximum delay imparted to the active signal portion of any one line is approximately seven microseconds.

17. A method as defined in claim 11, wherein said video signal further includes a color reference burst following said horizontal synchronizing signal in said horizontal blanking period, and wherein the maximum delay imparted to the active signal portion of any one line is equal to the duration of a horizontal blanking period less the duration of said color reference burst.

18. A method as defined in claim 17, further comprising the step of shifting said color reference burst to a predetermined position within each horizontal blanking period regardless of the delays imparted to the active signal portions of the lines before and after each said horizontal blanking period said shifted color reference burst beginning said maximum delay period after the end of the active signal portion of an undelayed line of said video signal.

19. An apparatus for encrypting video signals of the type comprising a plurality of lines each having an active signal portion representing a line of image to be displayed, with the active signal portions of successive lines of an original video signal being separated from one another by horizontal blanking periods including a horizontal synchronization pulse, said apparatus comprising:

means for removing said horizontal synchronization pulses from each horizontal blanking period; and delay means for delaying the active signal portions with respect to said original video signal by different delay periods less than the duration of a horizontal blanking period.

20. An apparatus as defined in claim 19, wherein said means for delaying comprises means for changing said delay period between successive lines.

21. An apparatus as defined in claim 20, wherein said video signal includes successive fields of plural lines, and wherein said delaying means delays the active signal portions of successive lines in a field in accordance with a pseudorandom sequence of delay periods.

22. An apparatus as defined in claim 19, wherein said video signal includes successive fields of plural lines, and wherein each field includes a first portion representing an image to be displayed, said apparatus further comprising:

means for generating a sequence code identifying the sequence of delays to be imparted to the active signal portions of successive lines in a particular field; and means for transmitting said sequence code with said video signal prior to the first portion of said particular field.

23. An apparatus as defined in claim 20, wherein said video signal includes successive fields of plural lines, and wherein each field includes a first portion representing an image to be displayed, said apparatus further comprising:

means for generating a sequence code identifying the sequence of delays to be imparted to active signal portions of successive lines in a particular field; and means for transmitting said sequence code with said video signal prior to the first portion of said particular field.

24. An apparatus as defined in claim 19, wherein said video signal further includes a color reference burst following said horizontal synchronizing signal in said horizontal blanking period, said apparatus further comprising means for shifting said color reference burst to a predetermined position within each horizontal blanking period regardless of the delays imparted to the active signal portions of lines before and after each said horizontal blanking period.

25. An apparatus as defined in claim 20, wherein the maximum delay imparted to the active signal portion of any one line is approximately seven microseconds.

26. An apparatus as defined in claim 20, wherein said video signal further includes a color reference burst following said horizontal synchronizing signal in said horizontal blanking period and wherein the maximum delay imparted to the active signal portion of any one line is equal to the duration of a horizontal blanking period less the duration of said color reference burst.

27. An apparatus as defined in claim 26, further comprising means for shifting said color reference burst to a predetermined position within each horizontal blanking period regardless of the delays imparted to the active signal portions of lines before and after each said horizontal blanking period, said shifted color reference burst beginning said maximum delay period after the end of the active signal portion of an undelayed line of said video signal.

28. An apparatus as defined in claim 22, wherein said video signal is accompanied by an audio signal portion, said apparatus further comprising means for encrypting said audio information in accordance with said sequence code.

29. An apparatus as defined in claim 19, wherein said delay means comprises:

means for receiving said video signal and providing a plurality of delayed versions thereof;

selection means responsive to a control signal for selecting one of said delayed versions; and means for generating said control signal in accordance with a desired sequence of delay periods for the active signal portions of successive lines.

30. An apparatus as defined in claim 19, wherein said delay means comprises:

first storage means for receiving and storing at least one line of said video signal at a succession of memory locations;

means for providing a succession of readout signals to said storage means for reading said video signal out of said storage means; and means for interrupting said succession of readout signals for the predetermined delay period associated with said at least one line.

31. An apparatus as defined in claim 30, wherein said delay means comprises first and second storage means for alternately storing and reading out the video signal for successive lines.

32. An apparatus as defined in claim 31, wherein said first and second storage means comprise CCD delay lines and said readout signals comprise clock signals.

33. An apparatus as defined in claim 31, wherein said first and second storage means comprise random access memories and said readout signals comprise address signals.

34. An apparatus of securely transmitting video signals from a transmitting station and receiving said video signals at a receiving station, said video signals being of the type including a plurality of lines each having an active signal portion representing a line of image to be displayed, with the active signal portions of successive lines of an original video signal being separated from one another by horizontal blanking periods including a horizontal synchronization pulse, said apparatus comprising:
    means for removing said horizontal synchronization pulse from each horizontal blanking period;
    first delay means for delaying the active signal portions with respect to said original video signal by different delay periods less than the duration of a horizontal blanking period to obtain an encrypted video signal;
    means for transmitting said encrypted video signal to said receiving station; and
    second delay means for delaying the active signal portions of the encrypted video signal by a delay period which is the complement of the delay imparted to each active signal portion by said first delay means, to thereby obtain a decrypted video signal.

35. An apparatus as defined in claim 34, wherein said first delay means comprises means for changing said delay period between successive active signal portions.

36. An apparatus as defined in claim 34, wherein said video signal includes successive fields of plural lines, and wherein said first delay means comprises means for delaying the active signal portions of successive lines in a field in accordance with a pseudorandom sequence of delay periods.

37. An apparatus as defined in claim 34, wherein said video signal includes successive fields of plural lines, and wherein each field includes a first portion representing an image to be displayed, said apparatus further comprising:
    means for generating a sequence code identifying the sequence of delays to be imparted to the active signal portions of successive lines in a particular field;
    means for transmitting said sequence code with said encrypted video signal prior to the first portion of said particular field;
    means for detecting said sequence code at said receiving station; and
    said second delay means comprising means for delaying the active signal portions of said encrypted video signal in accordance with said sequence code.

38. An apparatus as defined in claim 35, wherein said video signal includes successive fields of plural lines, and wherein each field includes a first portion representing an image to be displayed, said apparatus further comprising:
    means for generating a sequence code identifying the sequence of delays to be imparted to successive lines in a particular field; and
    means for transmitting said sequence code with said encrypted video signal prior to the first portion of said particular field.

39. An apparatus as defined in claim 34, wherein said video signal further includes a color reference burst following said horizontal synchronizing signal in said horizontal blanking period, said apparatus further comprising means for shifting said color reference burst to a predetermined position within each horizontal blanking period regardless of the delays imparted by said first delay means to the active signal portions of lines before and after each said horizontal blanking period.

40. An apparatus as defined in claim 35, wherein the maximum delay imparted to the active signal portion of any one line is approximately seven microseconds.

41. An apparatus as defined in claim 35, wherein said video signal further includes a color reference burst following said horizontal synchronizing signal in said horizontal blanking period, and wherein the maximum delay imparted to the active signal portion of any one line is equal to the duration of a horizontal blanking period less the duration of said color reference burst.

42. An apparatus as defined in claim 41, further comprising means for shifting said color reference burst to a predetermined position within each horizontal blanking period regardless of the delays imparted by said first delay means to the active signal portions of the lines before and after each said horizontal blanking period, said shifted color reference burst beginning said maximum delay period after the end of the active signal portion of an undelayed line of said video signal.

43. A method of encrypting video signals of the type comprising a plurality of lines each having an active signal portion representing a line of image to be displayed, with the active signal portions of successive lines being separated from one another by horizontal blanking periods including a horizontal synchronization pulse and a color reference burst following said horizontal synchronizing signal, said method comprising:
    removing said horizontal synchronization pulses from each horizontal blanking period;
    delaying the active signal portion of each line by a respective delay period; and
    shifting said color reference burst to a predetermined position within each horizontal blanking period regardless of the delays imparted to the active signal portions of lines before and after each said horizontal blanking period.

44. A method of securely transmitting video signals from a transmitting station and receiving said video signals at a receiving station, said video signals being of the type including a plurality of lines each having an active signal portion representing a line of image to be displayed, with the active signal portions of successive lines being separated from one another by horizontal blanking periods including a horizontal synchronization pulse and a color reference burst following said horizontal synchronizing signal, said method comprising:
    removing said horizontal synchronization pulse from each horizontal blanking period;
    delaying the active signal portions by different delay periods to obtain an encrypted video signal;
    transmitting said encrypted video signal to said receiving station;
    at said receiving station, delaying the active signal portions of the encrypted video signal by a delay period which is the complement of the delay imparted to each active signal portion at said transmitting station to thereby obtain a decrypted video signal; and shifting said color reference burst to a predetermined position within each horizontal blanking period regardless of the delays imparted to the active signal portions of lines before and after each said horizontal blanking period at said transmitting station.

45. An apparatus for encrypting video signals of the type comprising a plurality of lines each having an active signal portion representing a line of image to be displayed, within the active signal portions of successive lines being separated from one another by horizontal blanking periods including a horizontal synchronization pulse and a color reference burst following said horizontal synchronizing signal, said apparatus comprising:

means for removing said horizontal synchronization pulses from each horizontal blanking period;

delay means for delaying the active signal portions by different delay periods; and means for shifting said color reference burst to a predetermined position within each horizontal blanking period regardless of the delays imparted to the active signal portions of lines before and after each said horizontal blanking period.

46. An apparatus of securely transmitting video signals from a transmitting station and receiving said video signals at a receiving station, said video signals being of the type including a plurality of lines each having an active signal portion representing a line of image to be displayed, with the active signal portions of successive lines being separated from one another by horizontal blanking periods including a horizontal synchronization pulse and a color reference burst following said horizontal synchronizing signal, said apparatus comprising:

means for removing said horizontal synchronization pulse from each horizontal blanking period;

first delay means for delaying the active signal portions by different delay periods to obtain an encrypted video signal;

means for transmitting said encrypted video signal to said receiving station;

second delay means and delaying the active signal portions of the encrypted video signal by a delay period which is the complement of the delay imparted to each active signal; portion by said first delay means, to thereby obtain a decrypted video signal; and means for shifting said color reference burst to a predetermined position within each horizontal blanking period regardless of the delays imparted by said first delay means to the active signal portions of lines before and after each said horizontal blanking period.

* * * * *